US012659870B2

(12) United States Patent
Vannithamby et al.

(10) Patent No.: US 12,659,870 B2
(45) Date of Patent: Jun. 16, 2026

(54) METHODS AND DEVICES FOR POWER CONFIGURATIONS IN RADIO COMMUNICATION DEVICES

(71) Applicant: Intel Corporation, Santa Clara, CA (US)

(72) Inventors: Rath Vannithamby, Portland, OR (US); Kathiravetpillai Sivanesan, Portland, OR (US); Maruti Gupta Hyde, Portland, OR (US); Satish Jha, Portland, OR (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/558,696

(22) Filed: Dec. 22, 2021

(65) Prior Publication Data

US 2023/0199669 A1      Jun. 22, 2023

(51) Int. Cl.
 *H04W 52/24* (2009.01)
 *G06N 3/08* (2023.01)
  (Continued)

(52) U.S. Cl.
 CPC .............. *H04W 52/24* (2013.01); *G06N 3/08* (2013.01); *H04W 52/0248* (2013.01);
  (Continued)

(58) Field of Classification Search
 CPC . H04W 52/24; H04W 52/0248; H04W 52/06; H04W 52/365; H04W 76/28; H04W 76/27; H04W 52/0212; H04W 52/0216; H04W 52/0225; H04W 52/0229; H04W 52/0245; H04W 52/0258; H04W 52/0261;
(Continued)

(56) References Cited

U.S. PATENT DOCUMENTS

2015/0004995 A1      1/2015   Koc et al.
2019/0075613 A1 *    3/2019   Teyeb ................... H04W 76/11
(Continued)

OTHER PUBLICATIONS

Falkenberg, R., Sliwa, B., Piatkowski, N. and Wietfeld, C., 2018, August. Machine learning based uplink transmission power prediction for LTE and upcoming 5G networks using passive downlink indicators. In 2018 IEEE 88th Vehicular Technology Conference (VTC-Fall) (pp. 1-7). IEEE.*
(Continued)

*Primary Examiner* — Zhitong Chen
(74) *Attorney, Agent, or Firm* — Viering, Jentschura & Partner mbB

(57)      ABSTRACT

Devices and methods power configurations of radio communication devices. A device may include a memory storing communication activity data comprising information indicating a plurality of attributes with respect to communication activities over a radio connection between a user equipment (UE) and a base station (BS). The device may further include a processor that is configured to provide the communication activity data to a trained machine learning model configured to predict a communication activity for the radio connection between the UE and the BS and encode a power preference information for transmission to the BS based on the predicted communication activity.

25 Claims, 20 Drawing Sheets

FIG. 14

(51) Int. Cl.

| | | |
|---|---|---|
| *H04W 52/02* | (2009.01) | |
| *H04W 52/06* | (2009.01) | |
| *H04W 52/36* | (2009.01) | |
| *H04W 76/28* | (2018.01) | |

(52) U.S. Cl.
CPC ......... *H04W 52/06* (2013.01); *H04W 52/365* (2013.01); *H04W 76/28* (2018.02)

(58) Field of Classification Search
CPC ..... H04W 52/0277; G06N 3/08; G06N 3/044; Y02D 30/70
See application file for complete search history.

(56) References Cited

U.S. PATENT DOCUMENTS

2019/0215729 A1    7/2019  Oyman et al.
2022/0124634 A1*   4/2022  Bai ...................... H04B 17/373

OTHER PUBLICATIONS

Falkenberg, R., Sliwa, B., Piatkowski, N. and Wietfeld, C., Aug. 2018, Machine learning based uplink transmission power prediction for LTE and upcoming 5G networks using passive downlink indicators. In 2018 IEEE 88th Vehicular Technology Conference (VTC-Fall) (pp. 1-7). IEEE.*

3GPP TS 36.331 V15.5.0 (Mar. 2019).*

Luong, N.C., Hoang, D.T., Gong, S., Niyato, D., Wang, P., Liang, Y.C. and Kim, D.I., 2019. Applications of deep reinforcement learning in communications and networking: A survey. IEEE communications surveys & tutorials, 21(4), pp. 3133-3174.*

Salhab, N., Rahim, R., Langar, R. and Boutaba, R., Jun. 2020, Deep neural networks approach for power head-room predictions in 5G networks and beyond. In 2020 IFIP Networking Conference (Networking) (pp. 579-583). IEEE.*

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2", Jun. 2021, 391 pages, 3GPP TS 36.300 V16.6.0, Release 16.

3rd Generation Partnership Project, "Technical Specification Group Radio Access Network; Evolved Universal Terrestrial Radio Access (E-UTRA); Radio Resource Control (RRC); Protocol specification", Sep. 2021, 1091 pages, 3GPP TS 36.331 V16.6.0, Release 16.

Salhab, Nazih et al., "Deep Neural Networks approach for Power Head-Room Predictions in 5G Networks and Beyond", 2020, 6 pages, IEEE.

Chen, Xi et al., "Reinforcement Learning based QoS/QoE-aware Service Function Chaining in Software-Driven 5G Slices", Apr. 2018, 15 pages, v1, IEEE, arXiv.

Falkenberg, Robert, "Machine Learning Based Uplink Transmission Power Prediction for LTE and Upcoming 5G Networks using Passive Downlink Indicators", 2018 IEEE 88th Vehicular Technology Conference (VTC-Fall), Feb. 19, 2020, 7 pages, IEEE, arXiv.

Yang, Zhitao et al., "An advanced Power Control Algorithm Based on PHR in LTE-A PUSCH", 2015 International Conference on Computational Intelligence and Communication Networks (CICN), Dec. 12-14, 2015, 5 pages, IEEE.

Luong, Nguyen Cong et al., "Applications of Deep Reinforcement Learning in Communications and Networking: A Survey", IEEE Communications Surveys & Tutorials, Oct. 18, 2018, 37 pages, vol. 21, Issue 4, IEEE.

International Search Reportissued for the corresponding International patent application No. PCT/US2022/079259, dated Feb. 14, 2023, 11 pages (for informational purposes only).

European Search Report for parallel EP Application 22 912 554.7, dated Dec. 2, 2025, 4 pages (for reference purpose only).

* cited by examiner

100

102

202    204    206

208    210    212

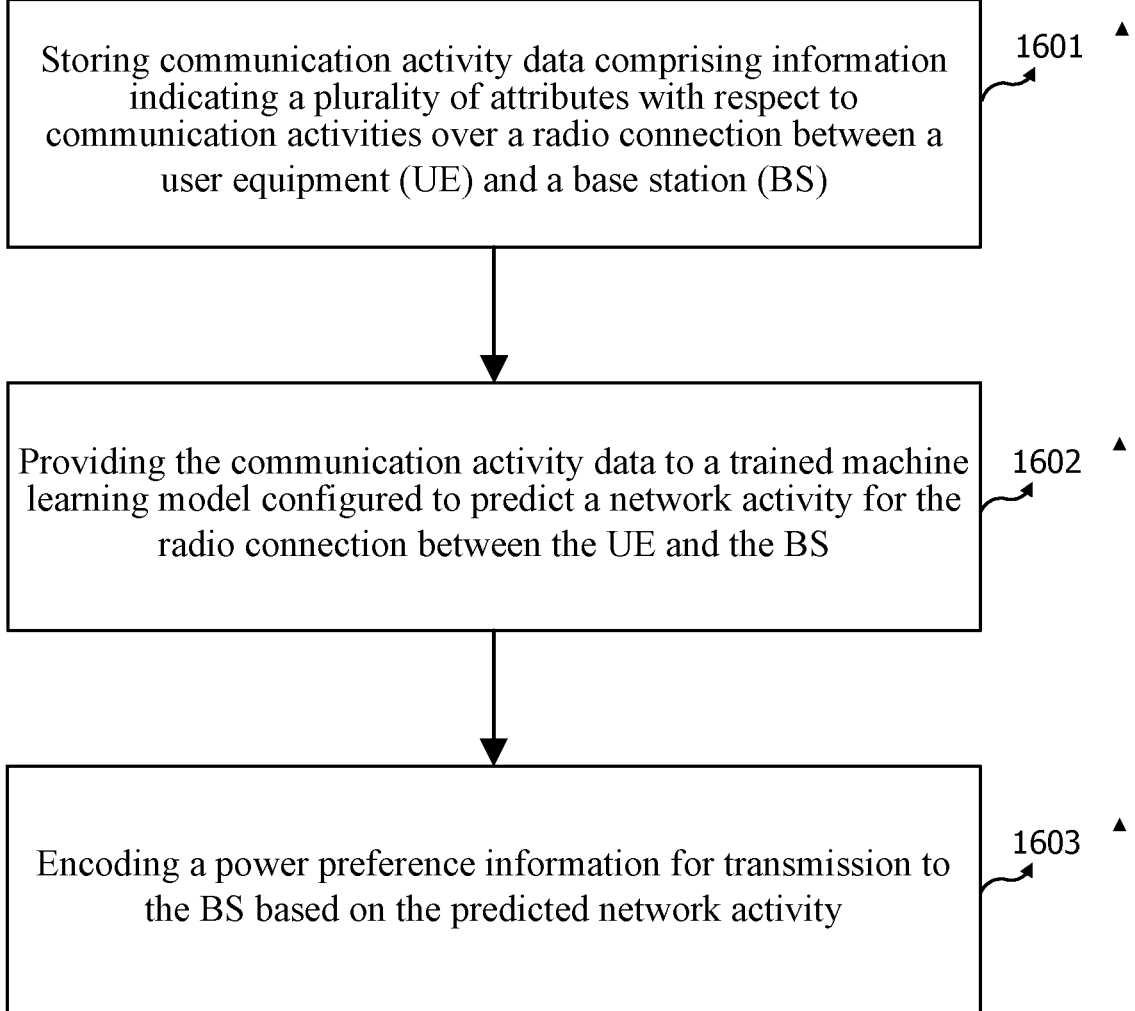

Storing communication activity data comprising information indicating a plurality of attributes with respect to communication activities over a radio connection between a user equipment (UE) and a base station (BS)          1601

Providing the communication activity data to a trained machine learning model configured to predict a network activity for the radio connection between the UE and the BS          1602

Encoding a power preference information for transmission to the BS based on the predicted network activity          1603

FIG. 16A

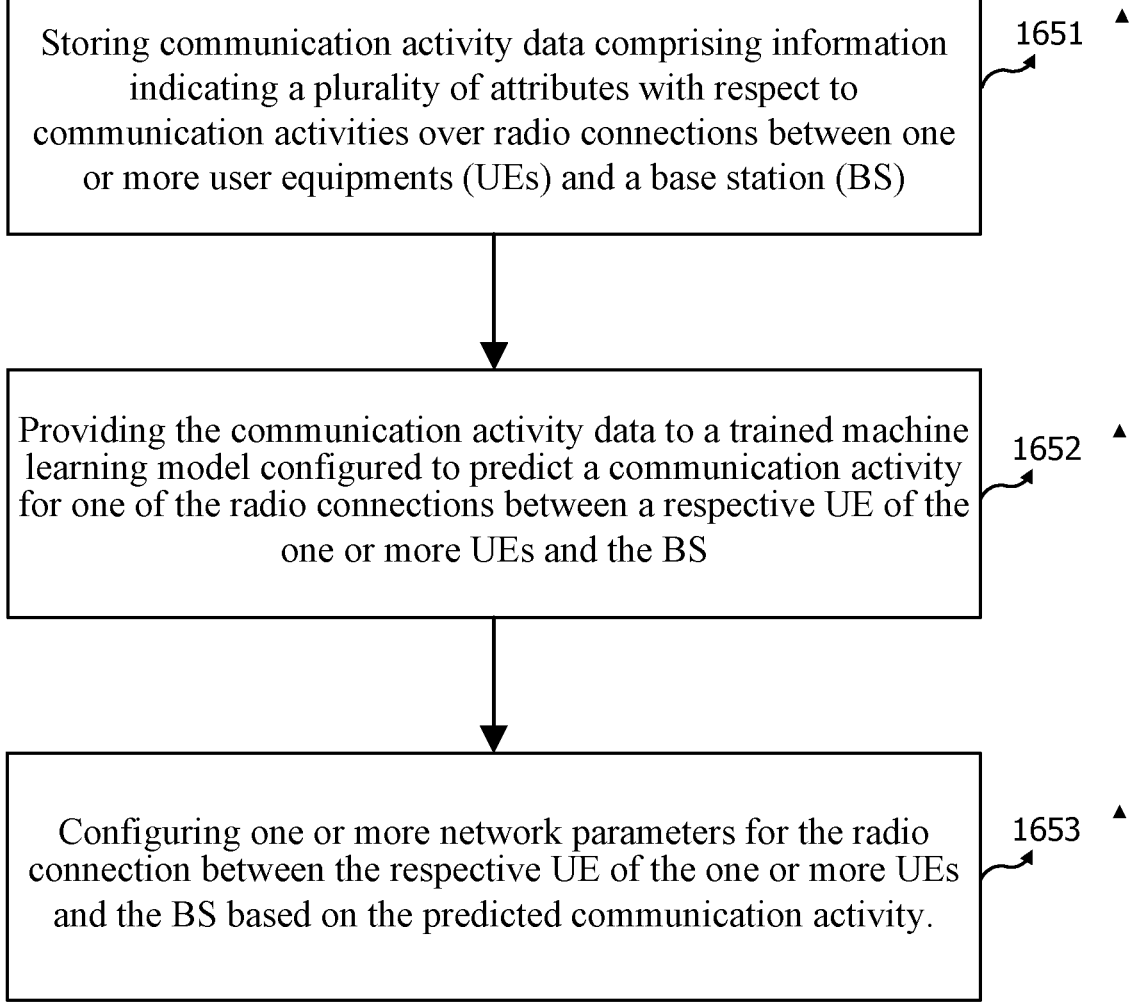

Storing communication activity data comprising information indicating a plurality of attributes with respect to communication activities over radio connections between one or more user equipments (UEs) and a base station (BS)    1651

Providing the communication activity data to a trained machine learning model configured to predict a communication activity for one of the radio connections between a respective UE of the one or more UEs and the BS    1652

Configuring one or more network parameters for the radio connection between the respective UE of the one or more UEs and the BS based on the predicted communication activity.    1653

FIG. 16B

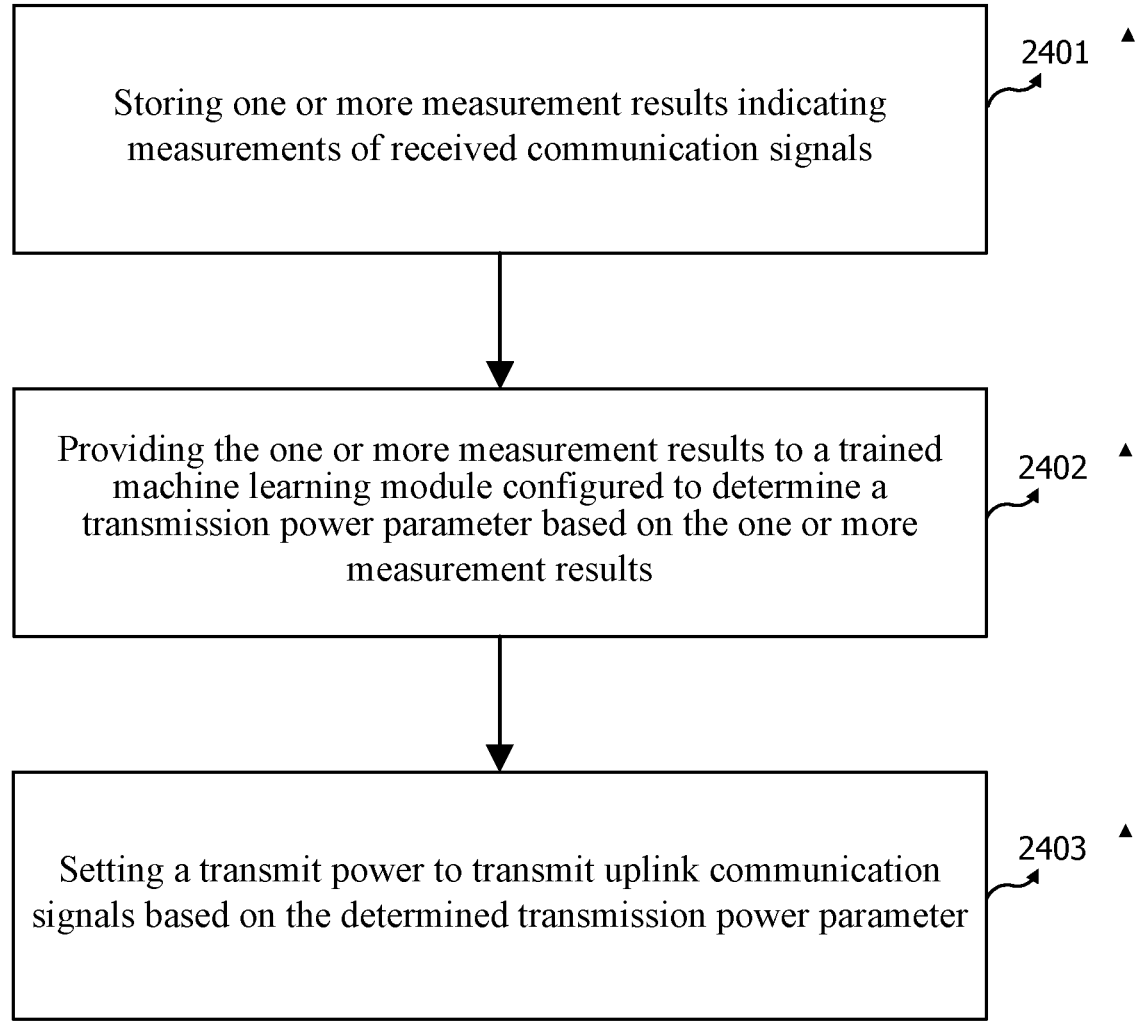

Storing one or more measurement results indicating measurements of received communication signals                          2401

Providing the one or more measurement results to a trained machine learning module configured to determine a transmission power parameter based on the one or more measurement results          2402

Setting a transmit power to transmit uplink communication signals based on the determined transmission power parameter          2403

FIG. 24

METHODS AND DEVICES FOR POWER CONFIGURATIONS IN RADIO COMMUNICATION DEVICES

TECHNICAL FIELD

This disclosure generally relates to methods and devices for power configurations of radio communication devices.

BACKGROUND

In various radio access technologies such as Fourth Generation (LTE) and Fifth Generation (5G) New Radio (NR), terminal devices may assist the radio communication network by providing their preference for a power configuration with an intention to reduce the consumption of power and maintain longer battery life. For example, in LTE and 5G, terminal devices may send a power preference indication (PPI) in a radio resource control connected mode (RRC_CONNECTED), and the access point (e.g. a base station) may configure the radio resources for the respective terminal device based on the PPI. Such configurations may include longer Discontinuous Reception (DRX) parameters or an early release of the RRC connection.

Furthermore, terminal devices may need to determine a power configuration with respect to transmitting power of the radio communication signals, so that the received power of the transmitted radio communication signal may be at a desired level, in which the received radio communication signal may have a desired signal to noise ratio (SNR) by minimizing co-channel interference for other radio communication devices communicating with the radio communication network. For example, in 5G RAN, open-loop power control and closed-loop power control methods are used to set or adjust the transmit power.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 16A shows an example of a method;

FIG. 16B shows an example of a method;

FIG. 24 shows an example of a method;

DESCRIPTION

Figure 1:
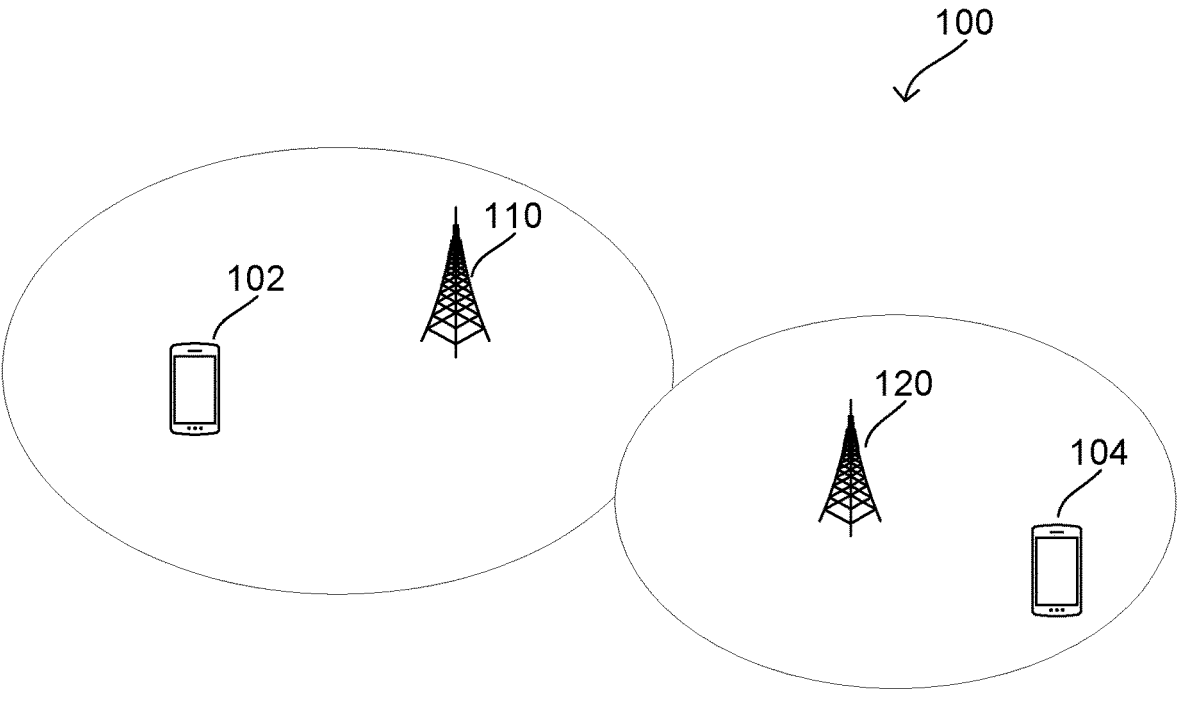
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("WITS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

Figure 2:
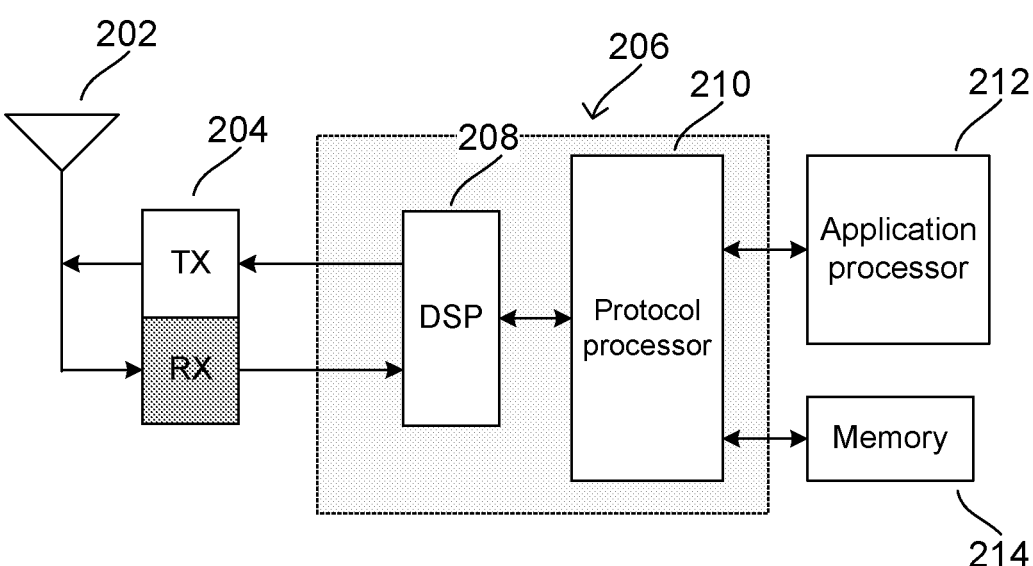
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device. The communication device may include a terminal device 102 according to some aspects, and it will be referred to as terminal device 102, but the communication device may also include various aspects of network access nodes 110, 120 as well. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver

204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

In 3GPP mobile radio communication standards, such as LTE or 5G, the requirements and/or conditions for a terminal device (e.g. UE) with respect to when to provide an assisting information to a base station (BS) indicating a power preference are left to the implementation of the terminal devices. UEs may determine when to inform the BS about their power preferences with respect to the mobile radio communication network. UEs may choose to provide or not to provide any assisting information to the BS with respect to their power preferences for the power configuration. UEs that are capable of providing power preferences may provide PPIs in RRC_CONNECTED mode upon being configured to provide PPIs and/or upon change of power preferences at the UE. A UE may provide the PPI in an UEAssistanceInformation message by setting the respective variable (e.g. powerPrefIndication) to the desired power mode (e.g. low-PowerConsumption or normal).

Figure 3:
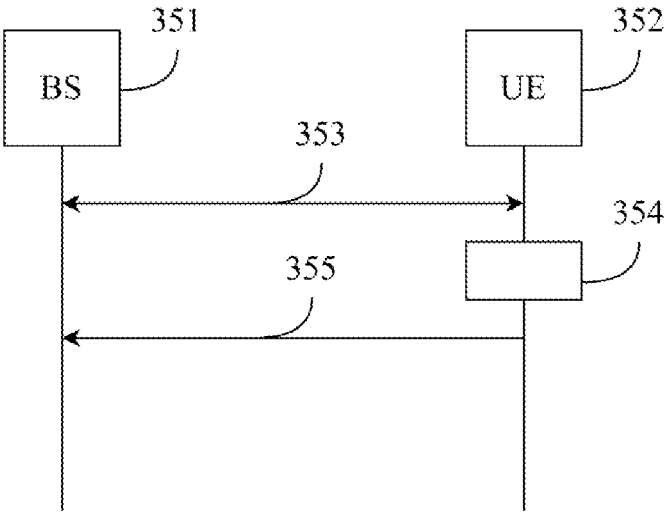
FIG. 3 shows an example of a message providing the PPI to a BS.

FIG. 3 shows an example of messaging providing the PPI to the BS. The BS 351 may reconfigure 353 the RRC in RRC reconfiguration with the UE 352 and UE may start operating in an RRC_CONNECTED mode. Accordingly, the UE 352 may encode 354 various information to be provided to the BS 351 including a UEAssistanceInformation message that may include the PPI, and send 355 the UEAssistanceInformation to the BS 351. Accordingly, the BS 351 may allocate resources to the UE 352.

Furthermore, A UE capable of providing its preference on DRX parameters of a cell group for power saving in RRC_CONNECTED may initiate the procedure in several cases, including upon having a preference on DRX parameters and upon change of its preference on DRX parameters. A UE capable of providing its preference on the maximum aggregated bandwidth of a cell group for power saving in RRC_CONNECTED may initiate the procedure in several cases, including upon having a maximum aggregated bandwidth preference and upon change of its maximum aggregated bandwidth preference. A UE capable of providing its preference on the maximum number of secondary component carriers of a cell group for power saving in RRC_CONNECTED may initiate the procedure in several cases, including upon having a maximum number of secondary component carriers preference and upon change of its maximum number of secondary component carriers preference. A UE capable of providing its preference on the maximum number of MIMO layers of a cell group for power saving in RRC_CONNECTED may initiate the procedure in several cases, including upon having a maximum number of MIMO layers preference and upon change of its maximum number of MIMO layers preference. A UE capable of providing its preference on the minimum scheduling offset for cross-slot scheduling of a cell group for power saving in RRC_CONNECTED may initiate the procedure in several cases, including upon having a minimum scheduling offset preference and upon change of its minimum scheduling offset preference.

In response to power preference indication, the BS 351 may configure the radio resources according to the preference of the terminal device. The BS 351 may adjust the DRX parameters, bandwidth parts (BWPs) that are assigned for the terminal device. Furthermore, the BS 351 may also configure secondary cells (SCells) based on the power preference of the terminal device in order to configure the radio resources for the terminal device. The BS 351 may also configure an early release of the RRC connection based on the power preference of the terminal device.

It may be desirable for a UE to send the indication for an optimal instance of time. Sending a PPI indicating a low power configuration may cause an impact on Quality of Services (QoS) requirements of the running applications for the UE. On the other hand, if it would take long for the UE to determine and send the PPI, that may result in the use of power, by also having conflicts for the QoS requirements that may have been scheduled for future in a time window in which may conflict with the PPI indicating the low power configuration. Therefore, it may desirable to provide an efficient decision mechanism for the UE to trigger the low power configuration at the BS side.

Figure 4:
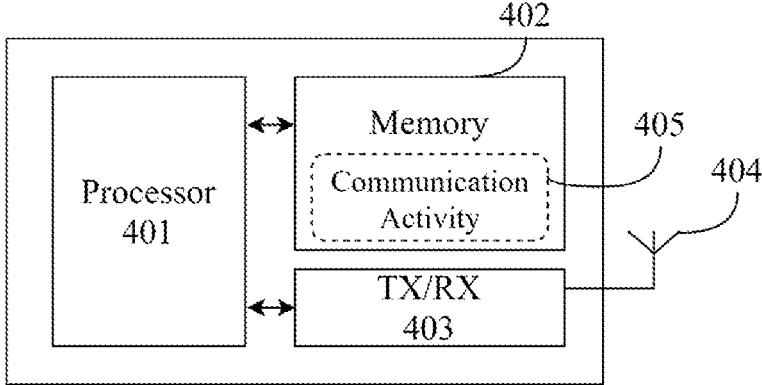
FIG. 4 shows an example of a device according to various examples in this disclosure.

FIG. 4 shows an example of a device according to various examples in this disclosure. The device is depicted as a radio communication device in this illustrative example, comprising a processor 401, a memory 402, and a transceiver 403 configured to receive and transmit radio communication signals using an antenna element 404. The illustration depicts that there is one antenna element coupled to the transceiver 403, however, this should not be considered as limiting, and the radio communication device may be coupled to any number of antenna elements. The transceiver 403 may include a plurality of antenna ports couplable to the plurality of antenna elements. The processor 401 may include one or more processors which may include a baseband processor and an application processor.

The memory 402 may be configured to store communication activity data 405. The communication activity data 405 may include information for various communication activities of the device over a radio connection with another communication device. As provided herein, information for various communication activities may include any information that relates to sending or receiving information to/from another communication device. The device may be a communication device that is capable to perform communication operations in LTE or NR. A UE or a BS may be or may include the device. Accordingly, the communication activity data 405 may include information with respect to the communication activities over the radio connection between the UE and the BS. When the BS includes the device, the communication activity data 405 may include information with respect to the communication activities over the radio connection between the BS and at least one UE.

The processor 401 may be configured to predict a radio communication activity for the radio connection using a trained artificial intelligence/machine learning model (AI/ML). The processor 401 may provide the communication activity data to an input of the trained AI/ML, and the trained AI/ML may be configured to provide a prediction for the communication activity for the radio connection between the BS and the UE. In various examples, the prediction for the communication activity may include a prediction of no communication activity. The processor 401 may implement the AI/ML based on a plurality of machine model parameters stored in the memory, or alternatively provide the received measurement results to an external processor or an external computing device that is configured to implement the AI/ML as provided in this disclosure. The processor 401 may include an accelerator or a neuromorphic processor to implement the AI/ML.

The processor 401 may obtain (e.g. generate) the communication activity data according to the operations of the device when the device is connected to the other communication device over the radio connection. The processor 401 may access the required information for the communication activity data through various sources, such as RRC configuration messages exchanged between the BS and a UE, Medium Access Layer (MAC) information exchanged between the BS and a UE, UE information that is stored in a memory (e.g. the memory 402), application related information from running applications, etc. The processor 401 may access the information that is stored in the memory 402 for other operations to obtain the information with respect to the communication activity data 405 when it is desired and perform operations as provided in this disclosure accordingly. At least for the communication activity data 405 that the processor 401 may generate, the processor 401 may further store a time information for the respective attribute. The time information may indicate the instance of time that the processor 401 has generated the respective portion of the communication activity data 405, or the instance of time that the processor 401 respective portion of the communication activity data 405 relates to. Furthermore, once the respective AI/ML provides an output, the processor 401 may perform various actions with respect to the output of the AI/ML.

Figure 5:
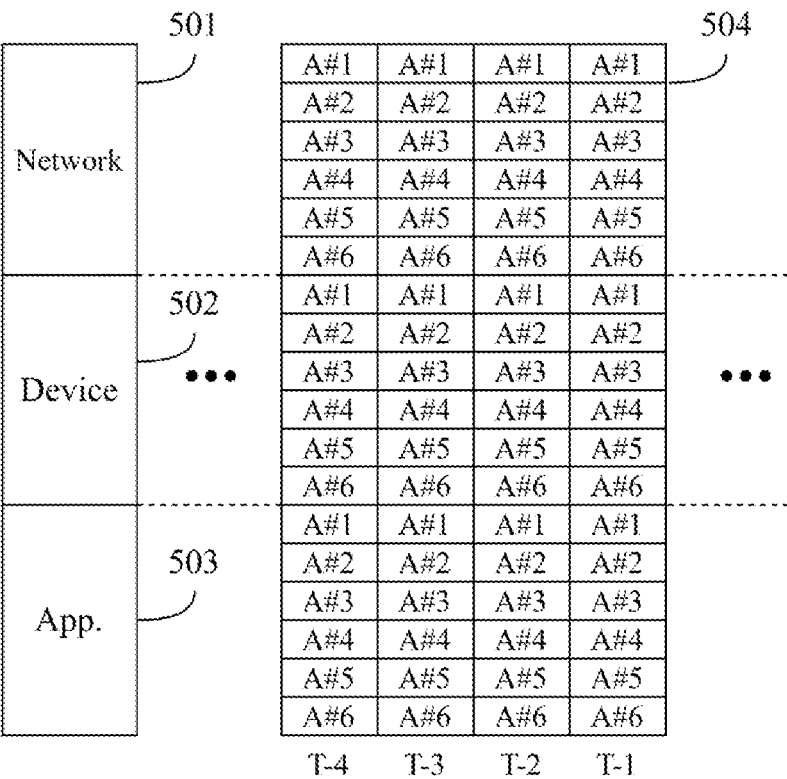
FIG. 5 shows an example of a representation of the communication activity data.

FIG. 5 shows an example of a representation of the communication activity data. The communication activity data may include network data 501 including information indicating network related attributes for the past communication activities, device data 502 including information indicating device related attributes for the past communication activities, and application data 503 including information indicating application related attributes for the past communication activities.

Each of the network data 501, the device data 502, and the application data 503 may include information with respect to a plurality of attributes 504 with respect to the respective data type. The communication activity data may provide information with respect to each of these attributes in a time-series manner. In this illustrative example, the communication activity data stored in the memory is depicted to have a time-series configuration. In various examples, the processor may provide the input to the AI/ML as the communication activity data in a time-series configuration by accessing the memory that stores information indicating the attributes at an instance of time. In the time-series configuration, each data element for an attribute may correspond to a predefined instance of time (e.g. 1 ms, 5 ms), and the time series-data may include data elements for the attribute for a plurality of instances of time.

Figure 6:
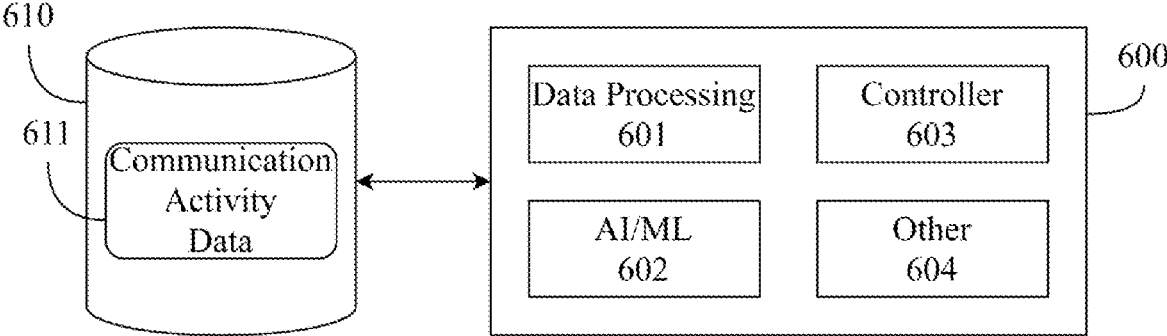
FIG. 6 shows an example of a processor and a memory of a device according to various aspects provided in this disclosure.

FIG. 6 shows an example of a processor and a memory of a device according to various aspects provided in this disclosure. The processor 600 is depicted to include various functional modules that are configured to provide various functions respectively. The skilled person would recognize that the depicted functional modules are provided to explain various operations that the processor 600 may be configured to. Similarly, the memory 610 is depicted to include the communication activity data as a block, however, the memory may store the communication activity data in any kind of configuration, which may further be provided in this disclosure in various examples. Furthermore, the AI/ML module 602 is depicted as it is implemented in the processor 600 only as an example, and any type of AI/ML implementations which may include the implementation of the AI/ML module 602 in an external processor, such as an accelerator, a graphics processing unit (GPU), a neuromorphic chip, or in a cloud computing device, or in a memory (e.g. the memory 610) may also be possible according to any methods.

The processor 600 may include a data processing module 601 that is configured to process the data and generate at least a portion of the communication activity 611 stored in the memory 610 as provided in various examples in this disclosure. In various examples, the communication activity 611 may include information for a plurality of communication activities that the device has performed in the past for at least within a period of time in a plurality of instances of time. The data processing module 601 may generate a portion of the communication activity data 611 according to the operations of the device.

As an example, the data processing module 601 may track the network activity and store the information related to the activity of the network (such as network traffic type (e.g. uplink or downlink) and amount of data for the respective network traffic for various instances of time). Furthermore, the data processing module 601 may access information directly for another portion of the communication activity data 611 that is already stored in the memory 610 for operations of other entities. For example, the memory 610 may include already the information related to the UE (e.g. battery level, location, etc.) for other operations, so the data processing module 601 may not generate the same information to regard that particular information as the communication activity data 611.

The communication activity data 611 may include information with respect to a plurality of attributes about the communication activities. One of the attributes may be related to the attributes of the network with respect to the radio connection. The communication activity data 611 may include network data that provides information indicating attributes of the radio communication network. The network data may include the type of the radio access network indicating the supported radio access mode for the radio connection. The type of the radio access network might affect the patterns of the communication activity between the BS and UEs, and accordingly may affect the prediction of the communication activity.

Furthermore, the network data may include information indicating the configuration of the radio communication between the UE and the BS. Such information indicating the configuration of the radio communication may include information used during RRC configuration (e.g. RRCReconfiguration message) between a UE and the BS. In particular, the network data may include information indicating the received DRX parameters from the BS for the DRX operation. The received DRX parameters may include a DRX Cycle parameter, a duration of ON time within one DRX Cycle, a DRX inactivity timer parameter, a DRX retransmission timer parameter, a short DRX Cycle parameter, or a DRX short cycle timer parameter.

Principally, DRX parameters provide indications to the UE with respect to when the UE may operate in ON time or OFF time to receive radio communication signals from the BS. Accordingly, DRX parameters that the BS may configure for the UE (provided that the UE supports the DRX) may affect the prediction of the communication activity. Furthermore, the network data may include an identifier of the BS and/or the network operator operating through the BS. This may provide the ability to differentiate the BS and/or the network operator, which may affect the communication activity between the BS and the UE.

Furthermore, the network data may include information for the previous power preference indications of the UE and power preference configuration parameters received from the BS to provide power preference indications. The previous power preference indications of the UE may provide direct indications for the prediction of the communication activity, and PPI configuration parameters such as a PPI timer or remaining duration with respect to the received PPI timer may affect the prediction of the communication activity.

Furthermore, the network data may include status information indicating whether the radio connection between the UE and the BS is active or inactive. Furthermore, the network data may include state information indicating whether the radio of the UE is turned on or turned off. Such information may also provide an insight for the prediction of the communication activity.

Furthermore, the network data may include information indicating reference signal received power (RSRP) measurements of the UE in response to received reference signals from the UE, message information indicating one or more attributes of the received or transmitted messages, such as whether the message is received or transmitted, whether the communication is uplink communication or downlink communication, time information including time of departure for transmitted messages or time of arrival for received messages, an identifier for a user, or type of the respective message. Such information may also provide an insight about the prediction of the communication activity.

In various examples, a BS may include the device. Accordingly, the network data may include any of the network data provided in this disclosure for other communication devices that are communicatively coupled to the device, such as for a plurality of UEs that are communicatively coupled to the device. In such a scenario, the network data may include at least one PPI received from one or more UEs. Furthermore, the network data may further include the PPI timer information that the BS has used to configure one or more UEs, or remaining durations with respect to configured PPI timers.

Furthermore, the network data may include DTX parameters that are assigned for the one or more UEs. In various examples, the network data may include a scheduling information indicating communication scheduling or scheduled resources for the one or more UEs or the scheduling granularity with respect to the one or more UEs. The network data may include a quality metric indicating an overall network situation.

The communication activity data 611 may further include attributes that may be related to the attributes of the UE. The communication activity data 611 may include device data that provides information indicating attributes of the UE. For example, the device data may include battery information indicating the current battery level of the UE. A charging or a fully-charged battery may indicate for the prediction of the communication activity that the UE may prefer a normal operation and prioritize the radio communication over the low-power more with respect to the prediction of the communication activity.

The battery information may further include one or more constraints with respect to the battery of the UE. The constraints may include the capacity of the battery of the UE, or an estimated time for the battery to run out according to past operations and the remaining electrical supply power of the battery. Such constraints may indicate that the UE may prefer a low-power operation to extend the battery supply as much as possible. Furthermore, the device data may include information indicating the location of the UE, in particular the location of the UE relative to the BS.

Furthermore, the device data may include buffer length information indicating the amount of the data stored in an uplink buffer (e.g. a buffer for a radio link control layer) scheduled for transmission to the BS. The buffer length information may provide a direct relationship with respect to the scheduled transmissions for the prediction of the communication activity. Furthermore, the device data may include the type of the UE. The UE may be any type of communication device, such as a machine-type communication (MTC) device, an interne of things (IoT) device, a low cost MTC device, a smartphone. Such type information may provide an insight with respect to abilities and constraints of the UE for the network activities (e.g. data rate for uplink or downlink) and affect the prediction of the communication activity. In various examples, such constraints may also be provided by UE category information that may also be signaled with ue-CategoryDL and ue-CategoryUL information, and the device data may also include the UE category information.

Furthermore, the device data may further include information with respect to the capabilities of the UE. The device data may include information with respect to the DRX support of the UE, a wake-up radio (WuR) ability of the UE, or preferences for these aspects, such as UE preference on DRX parameters, preference on maximum aggregated bandwidth, preference of a maximum number of secondary component carriers, preference on the maximum number of MIMO layers of a cell group, preference on the maximum number of MIMO layers, or preference of a minimum scheduling offset, or user's preference with respect to power-saving or QoS. Such preferences may further provide further insight for the prediction of the communication activity.

Furthermore, the device data may include user information indicating usage or behavior patterns of the user that is currently using the UE. The UE may obtain the user information according to various known methods to identify user patterns or behaviors of the user. The data processing module 601 may obtain the user information according to the interaction of the user with the UE. Such interactions may include applications that the user interacts with and the QoS requirements of the interacted applications, position of the UE relative to the user, past data requirements, etc., which may provide an indication to the network usage of the user.

In various examples, the data processing module 601 may obtain user-related information from various sources that may indicate the behavior or usage pattern of the user with respect to the communication activities and provide this user-related information to another AI/ML that is configured to predict behavior for the user based on the input, and the user-related information may further include the predicted behavior of the user.

Furthermore, in particular, when a BS includes the device, the device data may also include any one of the examples provided in this disclosure for the one or more UEs indicating one or more attributes with respect to the one or more UEs. The BS may receive information from the one or more UEs providing indication with respect to the predefined attributes. Such attributes may include battery information, location information, device type or category of the one or more UEs, or user information with respect to the users of the one or more UEs.

The communication activity data 611 may further include attributes that may be related to the attributes of the running applications on the UE. The communication activity data 611 may include application data that provides information indicating attributes of the running applications. For example, the application data may include information indicating network characteristics for each of the running applications including an expected measure of network performances for the respective running application.

The network characteristics or expected network measures may be represented by Quality of Services (QoS) requirements with respect to the respective application, or Quality of Experience (QoE) requirements with respect to the respective application, a further quality score for the respective application, or a latency tolerance of the application. Further categories that may define the latency tolerance or other perceptual measures that the applications may provide may further be used. Such information may provide an insight with respect to the resources that the applications may need during their operation and accordingly, may affect the prediction of the communication activity.

In various examples, the data processing module 601 may obtain these measures from an application layer entity providing functions at the application layer according to the open systems interconnection (OSI) model. In some examples, the processor 600 may obtain these measures based on QoS parameters (e.g. 5QI for 5G) with respect to the scheduled or transmitted QoS flows in lower layers. For any of these operations, the application data may also include the information indicating the running applications, as the QoS requirements may be directly indicated by the running applications.

Furthermore, in particular, when a BS includes the device, the application data may also include any one of the examples provided in this disclosure for the one or more UEs indicating one or more attributes with respect to the one or more UEs. The BS may receive information from the one or more UEs providing indication with respect to the predefined attributes. Such attributes may include running applications, application identifiers, and network characteristics information with respect to the running applications at the one or more UEs.

The AI/ML module 602 may implement the AI/ML. The AI/ML module 602 may receive input data including the communication activity data 611, and the AI/ML module 602 may be configured to predict a communication activity for the radio connection between the UE and the BS based on the input data. The processor 600 may further include a controller 603 to control the AI/ML module 602. The controller 603 may provide the input data to the AI/ML module 602, or provide the AI/ML module 602 instructions to perform the prediction.

Furthermore, the controller 603 may control the AI/ML module 602 according to a predefined event. For example, the controller 603 may provide instructions to the AI/ML module 602 to perform the AI/ML algorithm based on the battery level of the device, such as when the battery level is above a predefined threshold. Furthermore, the controller 603 may provide instructions to the AI/ML module 602 to operate in a low power mode in which the AI/ML module 602 does not perform the AI/ML algorithm when the device is being charged.

Furthermore, the processor 600 may include a data module to implement other processing functions 604 associated with other functions of the device (e.g. baseband modem 206, application processor 212, or other one or more processors as provided with respect to FIG. 2).

Figure 7:
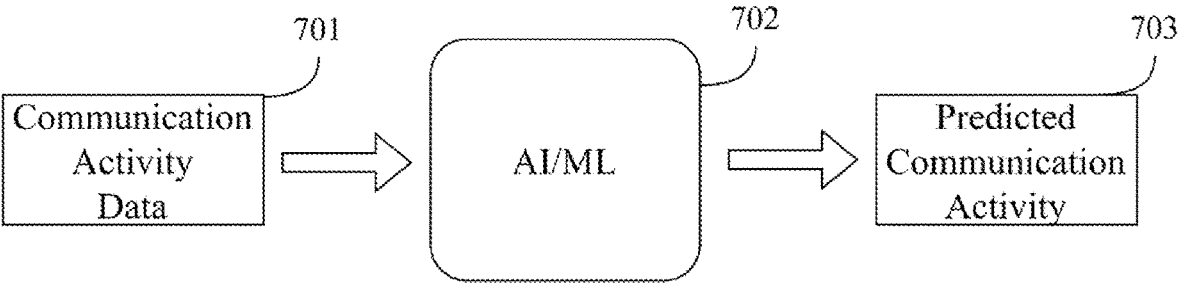
FIG. 7 shows schematically an example of an AI/ML.

FIG. 7 shows schematically an example of an AI/ML which the AI/ML module 602 may implement. The AI/ML 702 may be any type of machine learning model configured to receive the input data 701 including the communication activity data and provide an output 703 indicating a predicted communication activity. The AI/ML 702 may include any type of machine learning model suitable for the purpose. The AI/ML 702 may include a neural network, including various types of neural networks. The neural network may be a feed-forward neural network in which the information is transferred from lower layers of the neural network close to the input to higher layers of the neural network close to the output. Each layer includes neurons that receive input from a previous layer and provide an output to a further layer based on certain weight parameters adjusting the input information.

The AI/ML 702 may include a convolutional neural network (CNN), which is an example for feed-forward neural networks that may be used for the purpose of this disclosure, in which one or more of the hidden layers of the neural network include a convolutional layer that performs convolutions for their received input from a lower layer. The CNNs may be helpful for pattern recognition and classification operations. The CNN may further include pooling layers, fully connected layers, and normalization layers.

The AI/ML 702 may include a recurrent neural network in which the neurons transfer the information in a configuration that the neurons may transfer the input information to a neuron of the same layer. Recurrent neural networks (RNNs) may help to identify patterns between a plurality of input sequences, and accordingly, RNNs may identify temporal pattern provided as a time-series data and perform predictions based on the identified temporal patterns. In various examples of RNNs, long short-term memory (LSTM) architecture may be implemented. The LSTM networks may be helpful to perform classifications, and processing, and predictions using time series data.

In various examples, the neural network may be configured in top-down configuration in which a neuron of a layer provides output to a neuron of a lower layer, which may help to discriminate certain features of an input.

The AI/ML 702 may include a reinforcement learning model. The reinforcement learning model may be modeled as a Markov decision process (MDP). The MDP may determine an action from an action set based on a previous observation which may be referred to as a state. In a next state, the MDP may determine a reward based on the next state and the previous state. The determined action may influence the probability of the MDP to move into the next state. Accordingly, the MDP may obtain a function that maps the current state to an action to be determined with the purpose of maximizing the rewards.

The AI/ML 702 may include a trained AI/ML 702 that is configured to predict a communication activity (or provide output as provided in various examples in this disclosure) based on the input data including training communication activity data. The trained AI/ML 702 may be obtained via an online and/or offline training. For the offline training, a training agent may train the AI/ML 702 based on conditions of the device including the constraints of the device (e.g. battery constraints), category of the device, UE capabilities, etc. in a past instance of time. Furthermore, the training agent may train the AI/ML 702 (e.g. by adjusting the machine learning model parameters stored in the memory) using online training methods based on the latest (or actual) implementation conditions, such as the location of the device, etc. Furthermore, the processor may further optimize the AI/ML 702 based on previous inference results including the determined parameter, and possibly based on a performance metric with respect to the predicted communication activity and the effect of the predicted communication activity with respect to the network traffic (e.g. radio OFF time, buffer length during the radio OFF time, etc.).

The training agent may train the AI/ML 702 according to the desired outcome. The training agent may provide the training data to the AI/ML 702 to train the AI/ML 702. The training data may include input data with respect to simulated operations. The training data may include training communication activity data generated in response to other communication activities. In various examples, the training agent may obtain the training data based on communication activities performed in various conditions, such as various distances to the BS, various application conditions and QoS requirements, different user behaviors and patterns, etc. The training agent may store the information obtained from the communication activities performed in such conditions to obtain the training data.

The processor 600 may implement the training agent, or another entity that may be communicatively coupled to the processor 600 may include the training agent and provide the training data to the device, so that the processor 600 may train the AI/ML 702. In various examples, the device may include the AI/ML 702 in a configuration that it is already trained (e.g. the machine model parameters in the memory are set). It may desirable for the AI/ML 602 itself to have the training agent, or a portion of the training agent, in order to perform optimizations according to the output of the inferences to be performed as provided in this disclosure.

Figure 8:
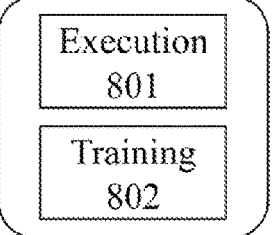
FIG. 8 shows schematically a diagram of an exemplary AI/ML.

FIG. 8 shows schematically a diagram of an exemplary AI/ML. The AI/ML may include an execution module 801 configured to receive the input and provide the output, and a training module 802 including the training agent as provided in this disclosure. In an example, the training module 802 may further include a neural network to train the execution block 801. The training module 802 may include the training agent as provided in this disclosure.

Figure 9:
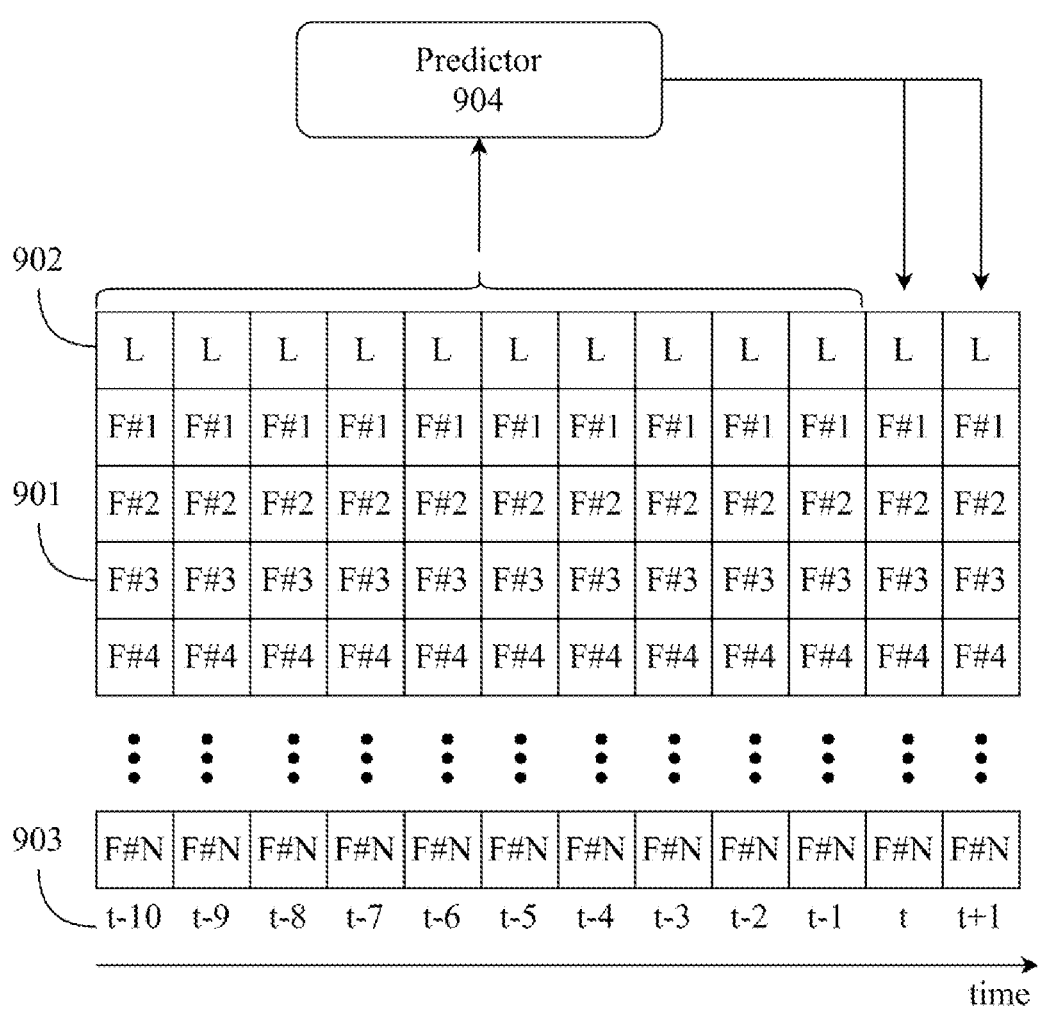
FIG. 9 shows schematically an exemplary representation of an LSTM-based AI/ML.

FIG. 9 shows schematically an exemplary representation of an LSTM-based AI/ML. An LSTM network may include a network of LSTM cells that may process the attributes provided for an instance of time from the input according to the attributes provided for the instance of time and one or more previous outputs of the LSTM that have taken in place in previous instances of time, and accordingly, obtain the output. The number of the one or more previous inputs may be defined by a window size. In various examples, the window size may be 10 and each instance of time may correspond to discrete time steps of 1 ms according to the time-series data, however, these numbers have been provided as an example, and it may be arranged according to the processing, memory, and time constraints and the input data.

In this illustrative example, the LSTM network may process the features 901 corresponding to the attributes (e.g. feature vectors obtained from the attributes) that the communication activity data includes and determine a label 902 for each instance of time 903 according to the features. The attributes that the communication activity data provides may include modem radio state, time of the day, uplink and downlink traffic information (data size, buffer lengths), RSRPs, time of delivery information, user_id, message_type_id, LTE protocol, etc. In various examples, the attributes may not be available for each instance of time.

The predictor 904 may accordingly predict the communication activity based on the features of the window size. In this example, the window size is depicted for 10 ms, but the window size may also be configured for a longer window size. The predictor 904 may predict the communication activity for one (e.g. the next, or after n instances of time) or more instances of time. The predicted communication activity may include one or more instances of time in which the radio of the device can be turned off or which the device may operate in a low-power mode. In various examples, the predicted communication activity may include one or more instances of time for which the device may send a PPI indicating a low-power mode to the BS. The predicted communication activity may include one or more instances of time for which the device may send a PPI indicating a normal mode (a QoS mode) to the BS.

The predictor 904 may further provide an output indicating a confidence score with respect to the prediction (e.g. the probability of the predicted communication activity). The skilled person would understand that the machine model parameters with respect to the LSTM (or any other examples of AI/ML as provided in this disclosure) are to be selected to give the desired performance. Such parameters may include weights and activation functions. Various metrics, including the accuracy of predicted communication activity over various users and activity durations, number of data packets lost due to radio being off or due to the device operating in a low power mode, or delay performances of one or more applications may be used to optimize the machine model parameters.

Figure 10:
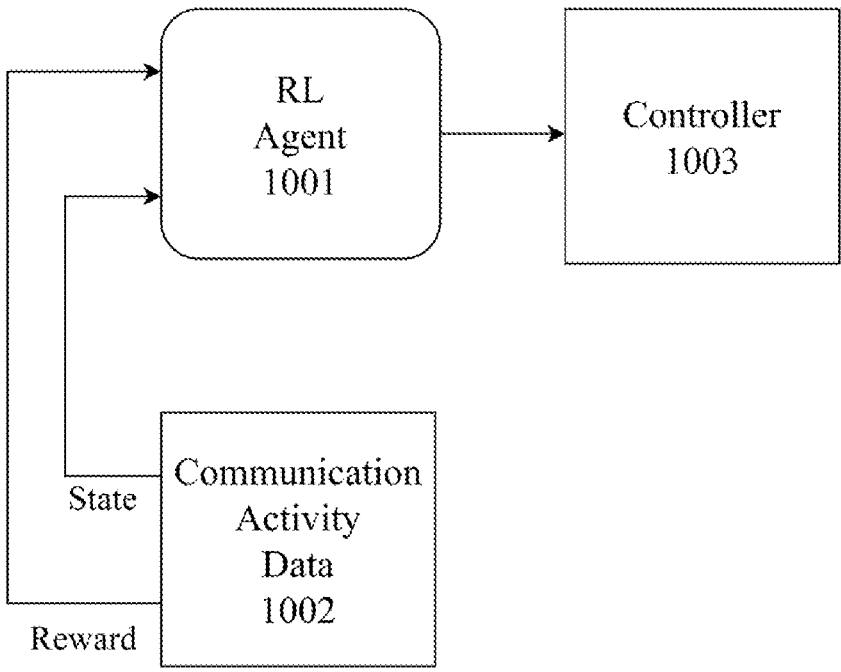
FIG. 10 shows an exemplary representation of a reinforcement learning model based AI/ML.

FIG. 10 shows an exemplary representation of a reinforcement learning model based AI/ML. A reinforcement learning agent (RL agent) 1001 may determine an action based on a first state that the communication activity data 1002 represents at a first instance of time and a reward provided for the first instance of time with respect to a transition from a previous instance of time to the first instance of time. For example, the RL agent 1001 may determine the action which may include sending a PPI indicating a low power mode, or sending a PPI indicating a normal (QoS) mode, or not sending any PPI. In one example, the RL agent 1001 may determine the action from the set of actions including the above. The utility function that the RL agent 1001 may perform may be to maximize the QoS or QoE. Accordingly, the RL agent 1001 may provide an indication of the determined action to a controller 1003, and the controller 1003 may accordingly encode the PPI to be transmitted to the BS in response to the determined action.

Furthermore, the RL agent 1001 may determine a reward based on the determined action in the first instance time and a second state that the communication activity data 1002 represents at a second instance time. The RL agent 1001 may receive the reward based on at least one of an impact of QoS or QoE based latencies, a change of the amount of data in uplink buffers, missed data packets according to the determined action, or a number of retransmissions. In various examples, an observing agent (not shown) may determine the reward based on the communication and provide the reward to the RL agent 1001. Accordingly, the RL agent 1001 may obtain the capability to map the states that the communication activity data 1002 indicates to the actions with a goal to maximize the QoS and/or QoE while preserving maximum power, or while sending as maximum number of PPIs indicating the low power mode, or while maximizing the duration of the low power mode for the device.

Figure 11:
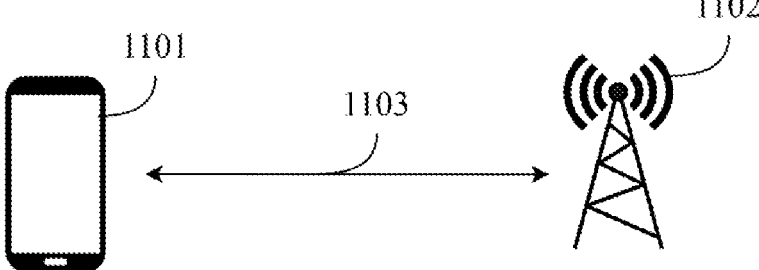
FIG. 11 shows an illustration of a radio communication network.

FIG. 11 shows an illustration of a radio communication network. The radio communication network includes a UE 1101 including the device as provided in this disclosure and a BS 1102 communicating over the radio connection between the UE 1101 and the BS 1102. The UE 1101 may store the communication activity data indicating a plurality of attributes with respect to communication activities between the UE 1101 and the BS 1102 in a memory as provided in this disclosure.

Figure 12:
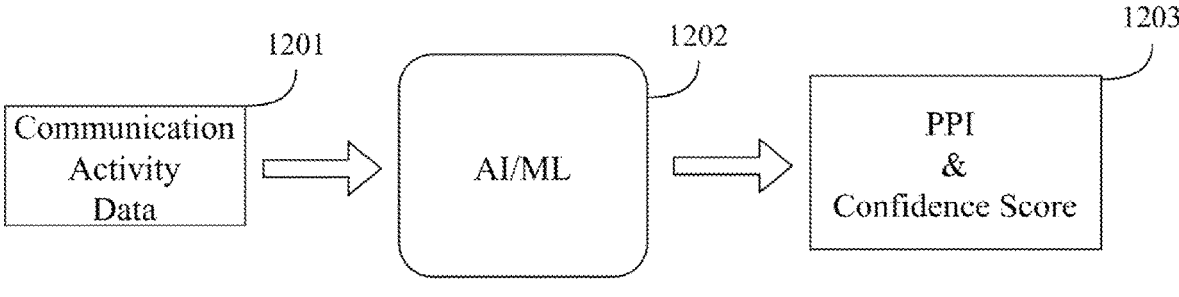
FIG. 12 shows an example of an AI/ML for a UE.

FIG. 12 shows an example of an AI/ML that a UE may implement. The AI/ML 1202 is configured to receive input data including the communication activity data 1201 stored in the memory of the UE (e.g. UE 1101) providing information with respect to various attributes for the communication activities and to provide an output representing the power preference information 1203 (e.g. whether the device may operate in a low-power mode or not) and a confidence score associated with the provided output. In this example, the communication activity data 1201 may include, in particular, the traffic type and activity, battery power level of the UE, user behavior, buffer lengths, running applications, and their QoS requirements. The communication activity data 1201 may further include information with respect to other attributes as provided in this disclosure.

The processor of the UE 1101 may encode a message indicating a power preference of the UE 1101 to the BS 1102 based on the output of the AI/ML 1202. The processor of the UE 1101 may encode the message when the output of the AI/ML 1202 indicates a PPI indicating a low-power mode. In various examples, the output may include an evaluation score indicating a probability of the predicted network activity allowing the device to operate in the low power mode. The output of the AI/ML 1202 may also include duration information indicating the duration of a predicted period of time allowing the device to operate in the low-power mode.

The UE 1101 may take the output of the AI/ML 1202 as a recommendation and perform one or more further processes in order to determine to send a PPI to the BS 1102. The UE 1101 may include a further rule-based model to determine to send the PPI to the BS 1102 based on the output of the AI/ML 1202. The processor of the UE 1101 may encode a PPI information to be transmitted to the BS 1102. Such period of time may associate with one or more components of a transceiver of the UE 1101 that the UE 1101 may deactivate. In response to the received PPI, the BS 1102 may configure the radio resources with respect to the UE 1101 based on the received PPI information.

Figure 13:
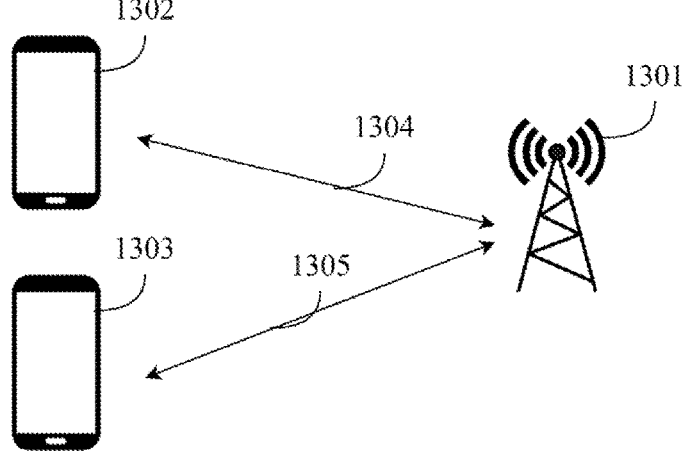
FIG. 13 shows an illustration of a radio communication system.

FIG. 13 shows an illustration of a radio communication system. In various examples, a BS 1301 may implement the device to configure one or more network parameters for the radio connection between one or more UEs, including a first UE 1302 and a second UE 1303. The first UE 1302 may communicate with the BS 1301 over a first radio connection 1304 and the second UE 1303 may communicate with the BS 1301 over a second radio connection 1305. The device of the BS 1301 may include a memory configured to store the communication activity data including information indicating a plurality of attributes with respect to communication activities over one or more radio connections 1304, 1305 between the one or more UEs 1302, 1303, and the BS 1301. The processor of the BS 1301 may provide the communication activity data to a trained AI/ML that is configured to predict a communication activity for one the radio connections between a respective UE of the one or more UEs 1302 and the BS 1301. In this illustrative example, the AI/ML may be configured to predict the communication activity for the radio connection between the first UE 1302 and the BS 1301.

It may be desirable to predict the communication activity on the BS 1301, because the BS may have higher computation and power resources compared to the UE 1302 in order to run the AI/ML. In this example, the communication activity data may include network data including traffic type and activity for the one or more UEs, one or more DRX parameters that the BS has assigned for the one or more UEs, user behavior, and device usage pattern for the one or more UEs, buffer lengths at the one or more UEs, and also buffer lengths indicating the amount of data scheduled for transmission at the BS, scheduling information indicating scheduled resources and granularity of the scheduling for the one or more UEs, a metric to indicate overall network situation, power preferences for the one or more UEs, device types or categories of the one or more UEs, battery constraints and/or battery level at the one or more UEs, PPI timer information, running applications, and corresponding network characteristics information, and received PPI information from the one or more UEs.

The communication activity data may further include information indicating which attribute belongs to which UE. For example, each attribute may be stored as a tuple of a corresponding information for the attribute and an identifier of the UE associated with the attribute. The processor of the BS 1301 may provide the communication activity data to the input of the AI/ML for each one or more UE in a configuration that indicates to the AI/ML to provide the output with respect to the predicted communication activity in the radio connection between the respective UE of the one or more UEs 1302, 1303 and the BS 1301. In one example, the input of the AI/ML may include the identifier of the UE as a separate input data element indicating to the AI/ML that the predicted communication activity is to be associated with the radio connection between the UE that the separate data element indicates and the BS 1301.

The memory of the BS 1301 may store one set of machine model parameters for each of the one or more UEs 1302, 1303. Accordingly, the AI/ML may provide the output for each UE 1302, 1303 based on the input and the respective set of machine model parameters for each of the one or more UEs 1302, 1303. Based on the output of the AI/ML for one of the one or more UEs 1302, 1303, the processor of the BS 1301 may optimize the set of machine model parameters for the respective UE. In various examples, the BS may coordinate the machine model parameters for further optimization.

The processor of the BS 1301 may assign each of the one or more UEs 1302, 1303 a group (e.g. low-QoS group, high-QoS group, or further details into multiple levels of QoS) based on the capabilities of each of the one or more UEs 1302, 1303 and the memory of the BS 1301 may store one group set of machine model parameters for each of the groups. Accordingly, the AI/ML may provide the output for each UE 1302, 1303 based on the input and the respective group set of machine model parameters with respect to the assigned group of the respective UE. Based on the output of the AI/ML for one of the one or more UEs 1302, 1303, the processor of the BS 1301 may optimize the group set of machine model parameters for the assigned group of the respective UE. The BS may coordinate the machine model parameters for further optimization.

In various examples, the AI/ML may be configured to provide the output based on the set of machine model parameters and the group set of machine model parameters for each one or more UEs. It may alternatively be desirable for the BS 1301 to consider overhead and the impact of allowing different DRX for different users. A grouping scheme may help the BS 1301 to keep the same parameters for the group. Accordingly, based on the output for the one or more UEs in one of the groups, the BS 1301 may take the provided output as the output for each UE within the same group, and configure the radio resources for each of the UEs within the same group based on the output.

As indicated in various examples with respect to the processor of the device, in this illustrative example, the BS 1301 may have received a portion of the communication activity data from the respective UEs with previous received data from the respective UEs, such as information indicating buffer lengths at the one or more UEs, user behaviors, running applications and their network characteristics information to obtain information with respect to the corresponding attributes of the communication activity data.

Figure 14:
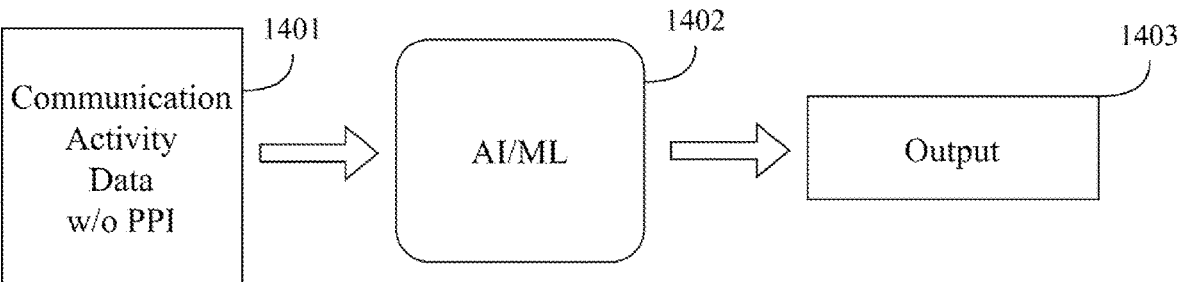
FIG. 14 shows schematically an example of an AI/ML.

FIG. 14 shows schematically an example of an AI/ML. The AI/ML 1402 is configured to receive input data including the communication activity data 1401 stored in the memory of the BS 1301 providing information with respect to various attributes for the communication activities. In this illustrative example, the BS 1301 may predict the communication activity for the first UE 1302 and the BS may not have received PPI from the first UE 1302. Accordingly, the communication activity data 1401 may not include the past PPI information received from the first UE 1302.

Since the communication activity data that the BS 1301 obtains may include various communication activity attributes with respect to the one or more UEs 1301, 1302 that are communicatively coupled to the BS 1301, the BS 1301 may schedule resources according to the prediction of the communication activities as well. Accordingly, the AI/ML 1402 may be trained to provide output with respect to various radio configurations based on the communication activity data.

For example, the AI/ML 1402 may be trained to provide an output indicating a power preference estimation for the respective UE. The processor of the BS 1301 may provide the communication activity data to the input of the AI/ML 1402 to receive a power preference estimation for the first UE 1302. The AI/ML 1402 may provide the output indicating the power preference estimation for the first UE 1302. Accordingly, the BS 1301 may configure the radio resources for the first UE 1302 based on the power preference estimation.

The AI/ML 1402 may be trained to provide an output indicating a DRX parameter for the respective UE. Accordingly, the processor of the BS 1301 may provide the communication activity data to the input of the AI/ML 1402 to receive a DRX parameter for the first UE 1302. The DRX parameter may include a parameter indicating at least one of a DRX Cycle, a duration of ON time within one DRX Cycle, a DRX inactivity timer, a DRX retransmission timer, a short DRX Cycle, a DRX short cycle timer. Accordingly, the BS 1301 may configure the radio resources for the first UE 1302 and the BS 1301 may also encode a message indicating the DRX parameter.

The AI/ML 1402 may be trained to provide an output indicating a parameter related to BWP to be scheduled for the respective UE. Accordingly, the processor of the BS

1301 may provide the communication activity data to the input of the AI/ML 1402 to receive a BWP parameter for the first UE 1302. Accordingly, the BS 1301 may configure the radio resources for the first UE 1302 to schedule the BWPs for the first UE 1302. BS 1301 may also encode a message indicating the configuration of the scheduled BWPs.

The AI/ML 1402 may be trained to provide an output indicating a parameter related to Wake-up Signal (WUS) to be scheduled for the respective UE. Accordingly, the processor of the BS 1301 may provide the communication activity data to the input of the AI/ML to receive a WUS parameter for the first UE 1302. Accordingly, the BS 1301 may configure the radio resources for the first UE 1302 and schedule a WUS for the first UE 1302 based on the WUS parameter. The WUS parameter may include information indicating an instance of time that the BS 1301 is scheduled to send a WUS to the first UE 1302. BS 1301 may further set the DRX parameters for the first UE 1302 and encode a message indicating the DRX parameters.

The AI/ML 1402 may be trained to provide an output indicating an idle mode to be assigned for the respective UE. Accordingly, the processor of the BS 1301 may provide the communication activity data to the input of the AI/ML 1402 to receive an indication of an idle mode for the first UE 1302. Accordingly, the BS 1301 may configure the radio resources for the first UE 1302 to configure the radio connection between the first UE 1302 and the BS 1301 into the idle mode. BS 1301 may also encode a message indicating the configuration of the idle mode. The AI/ML 1402 may be trained to provide an output indicating any combination of the parameters provided in this disclosure with respect to FIG. 14.

In one example, the processor of the BS 1301 may form a group of UEs comprising a plurality of UEs of the one or more UEs 1302, 1303. The processor of the BS 1301 may accordingly provide the communication activity data to the input of the AI/ML 1402 that is configured to predict the communication activity for the radio connections between each UE of the group of UEs and the BS 1301.

Figure 15:
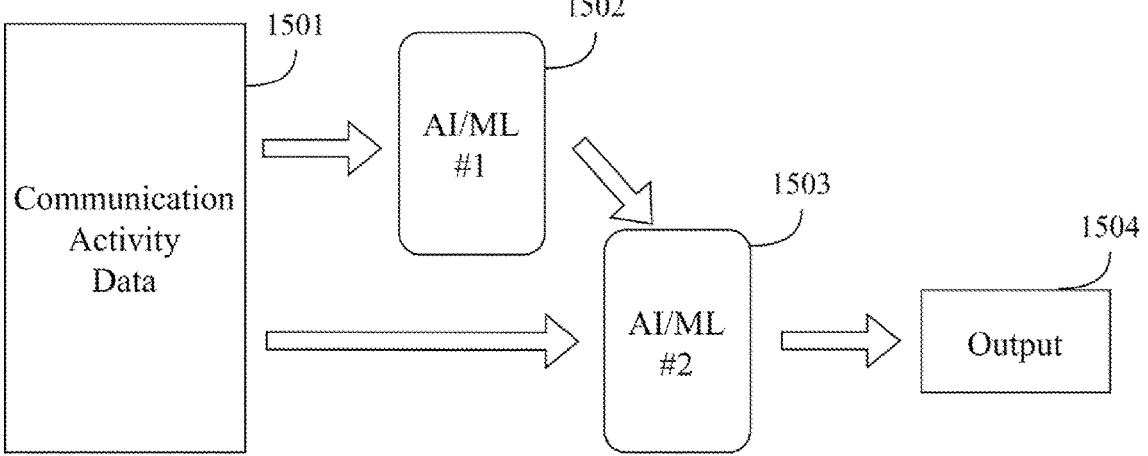
FIG. 15 shows another example of an AI/ML for a BS.

FIG. 15 shows another example of an AI/ML that a BS may implement. In this example, a first AI/ML 1502 is configured to receive input data including the communication activity data 1501, and provide an output indicating a power saving technique. In this example, the communication activity data 1501 further includes the PPI received from the UEs. The first AI/ML 1502 is trained to provide a classification result from a set including a DRX configuration, a WUS configuration, a BWP configuration, or an idle mode configuration. The second AI/ML 1502 is configured to receive the communication activity data 1501 and the output of the first AI/ML 1502 and to provide an output indicating parameters for the selected configuration of the first AI/ML 1502.

FIG. 16A shows an example of a method. The method may include storing 1601 communication activity data comprising information indicating a plurality of attributes with respect to communication activities over a radio connection between a user equipment (UE) and a base station (BS), providing 1602 the communication activity data to a trained machine learning model configured to predict a network activity for the radio connection between the UE and the BS, and encoding 1603 a power preference information for transmission to the BS based on the predicted network activity.

FIG. 16B shows an example of a method. The method may include storing 1651 communication activity data comprising information indicating a plurality of attributes with respect to communication activities over radio connections between one or more user equipments (UEs) and a base station (BS), providing 1652 the communication activity data to a trained machine learning model configured to predict a communication activity for one of the radio connections between a respective UE of the one or more UEs and the BS, configuring 1653 one or more network parameters for the radio connection between the respective UE of the one or more UEs and the BS based on the predicted communication activity.

Power control in a radio communication network may be one of the aspects to manage interference, device power consumption, and quality of connectivity (throughput, QoS, radio link failures (RLFs), etc.). The maximum allowed transmitted power (power spectral density) may be regulated by governments or regulatory agencies in radio communication networks. The relation between transmitted signal power and the received signal power is given by the Friis transmission equation. The power decay may be considered to be proportional to the square of the distance from the transmitting point and the frequency of the transmitted radio communication signal. In addition, the conditions of the channel in terms of the obstacles that the transmitted radio communication signal encounters and further environmental conditions may affect in terms of, for example, shadowing, reflection, blockage, etc.

As the frequency spectrum may be regarded as scarce, universal frequency reuse may further be considered in 3G, 4G, and 5G cellular systems to enhance spectral efficiency. When the frequency is reused in adjacent cells in a radio communication network, cell edge users may experience interference. Thus, it may be desirable to control the transmit power and perform scheduling.

Furthermore, terminal devices may be constrained by limited battery power. Some of the components may need relatively more power from other components in terminal devices such as displays, transmit power amplifier, and computation modules. Accordingly, choosing the transmit power level in an efficient manner may be desirable for saving battery power. Furthermore, the radio communication system may offer a variety of services with certain QoS requirements. It may be desirable to transmit data at a certain modulation and coding scheme (MCS) level with corresponding error rate performance to meet the QoS requirements. In various examples, the QoS requirements may be met if the transmit power is set at proper levels based on the path loss, other losses, MCS, and error rate requirements. Thus, transmit power control may also help to meet various QoS requirements.

A simple representation of an open-loop operating point of the transmit power may be represented with an equation $P=P_0+\alpha$ PL, in which the P0 may represent a nominal transmit power for the terminal device within the corresponding resource block, a may represent a path loss compensation factor and PL may represent the path loss. The terminal device may estimate the downlink path loss according to measurements with respect to received reference signals. The terminal device may average received IQ samples from the reference symbols over a time and frequency window with an intention to remove the fast fading effects. The averaged samples may be further combined and averaged to obtain reference signal received power (RSRP) value, and the terminal device may calculate the pathloss from the received information indicating the transmit power of the corresponding reference signal.

In a closed-loop power control, the transmit power may be represented with an equation $P=Min (P_c^{Max}, P_0+\alpha$ PL$+\Delta_{TF}+$ $f(\Delta_{TPC})+10$ log M), in which $P_c^{Max}$ may represent the maximum allowed power, $P_0+\alpha$ PL may represent the operating point for the resources (including, for example, a nominal power for a physical uplink shared channel (PUSCH), or a nominal power for a physical uplink control channel (PUCCH), $\Delta_{TF}+f(\Delta_{TPC})$ may represent a dynamic offset depending on the MCS and the TPC from the network access node, and 10 log M may represent the bandwidth factor. Furthermore, the terminal device may calculate calculations to generate a power headroom report (PHR) either periodically or on event driven basis to be transmitted to the network access node, by which the network access node determines $\Delta_{TPC}$.

Figure 17:
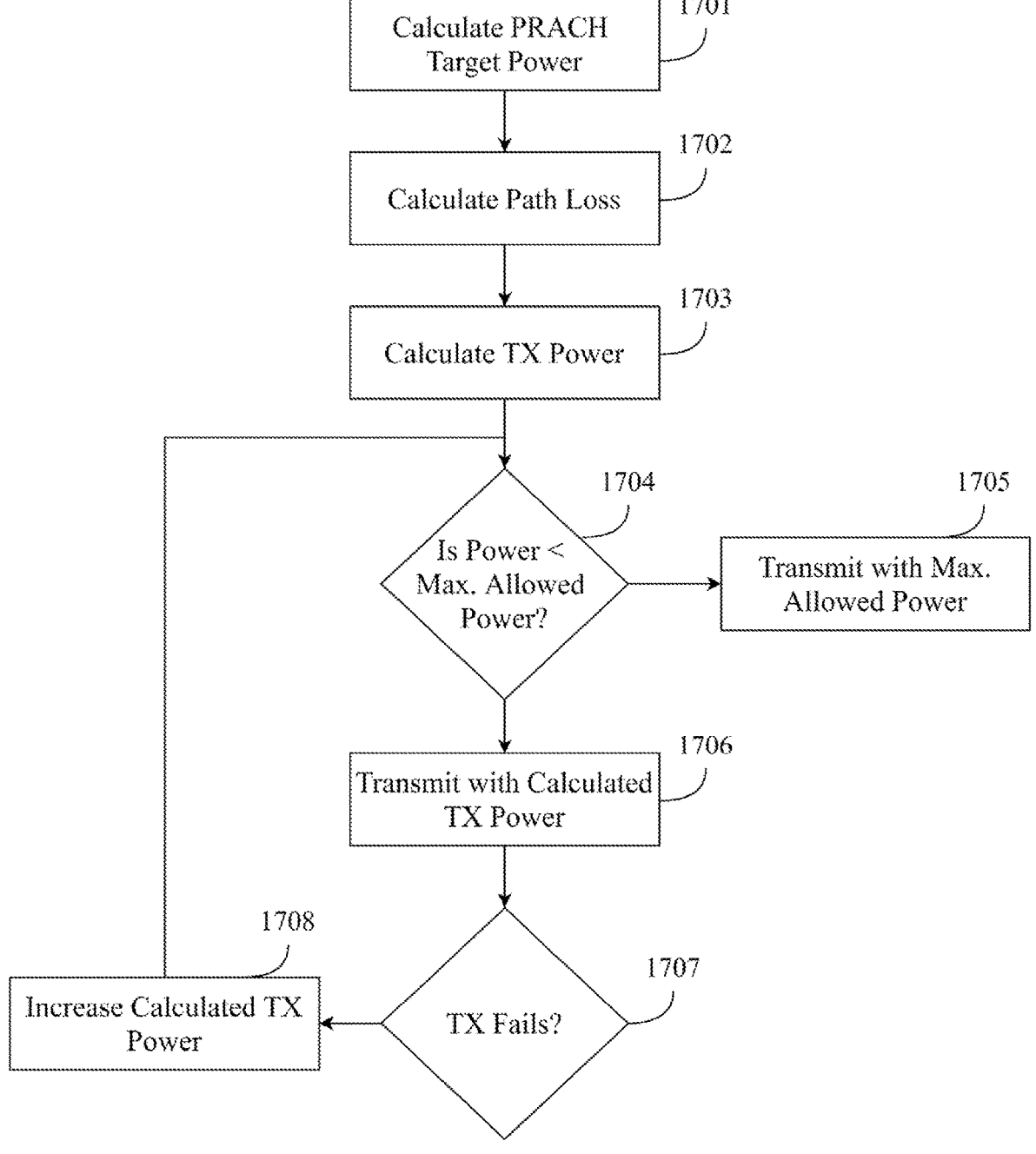
FIG. 17 exemplarily shows an illustration with respect to an open-loop power control in 4G-5G systems.

FIG. 17 exemplarily shows an illustration with respect to an open-loop power control in 4G-5G systems. A terminal device (e.g. a UE) may use the open-loop power control in a random access channel (RACH) process. The terminal device may calculate 1701 a PRACH target power based on a parameter received with an RRC configuration message (preambleReceivedTargetPower). The RRC parameter may also include information indicating preamble formats, and accordingly values indicating to increase the power for transmissions. Furthermore, the terminal device may calculate 1702 a path loss based on a power of a received reference signal (e.g. a signal synchronization block (SSB) or a channel state information reference signal (CSI-RS)) and information with respect to the received reference signal in the RRC configuration message.

The terminal device may calculate 1703 a transmit (TX) power based on the calculated PRACH target power and the calculated path loss. The terminal device may compare 1704 the calculated TX power with a maximum allowed power received from higher layers (e.g. indicated by network access node (e.g. via system information type#2 (SIB2) information)), and in case the calculated TX power is greater than the maximum allowed power, the terminal device may transmit 1705 the radio communication signal with the maximum allowed power. In case the calculated TX power is less than the maximum allowed power, the terminal device may transmit 1706 the radio communication signal with the calculated TX power. In case the transmission fails 1705, the terminal device may increase the calculated TX power 1708 based on the increase parameters provided by the RRC configuration message and repeat the steps starting from 1704.

Once the terminal device has established the PRACH with a network access node (e.g. a BS), the terminal device may control the TX power according to a closed-loop power control mechanism in which the corresponding network access node sends an information to control the TX power of the terminal device, which the information may be generated by the corresponding network access node according to calculations with respect to a target signal to noise ratio (SNR) or a target signal to interference and noise ratio (SINR), SNR and SINR information obtained by the terminal device based on measurements on reference signal, and power headroom reports (PHRs) received from the terminal device indicating how much TX power left for the terminal device to use in addition to the power being used with respect to a current transmission.

The terminal device may receive the control information (a transmit power control (TPC) command) from the corresponding network access node, which may indicate to the terminal device to increase or decrease the TX power, and the terminal device may control the TX power based on the received TPC command from the corresponding network access node.

It may desirable to employ an AI-based technique in order to predict the power level at terminal devices for both open-loop power control and closed-loop power control schemes in order to reduce the number of transmissions and also control the TX power based on predicted conditions of the radio communication channel. In addition, for the open-loop power control, accurate prediction of required power level may allow the terminal device to report the power headroom. It may also be desirable for the open-loop power control if the terminal device uses system information type#2 (SIB2) information and downlink path loss values.

Furthermore, it may desirable to employ an AI-based technique in order to predict appropriate TX power levels for terminal devices in order to reduce frequent PHR feedback overhead over corresponding radio communication channels. An AI-based technique may estimate the preferred TX power levels for the terminal devices based on uplink path loss or other processed signal attributes, system configurations, and PHR values.

Figure 18:
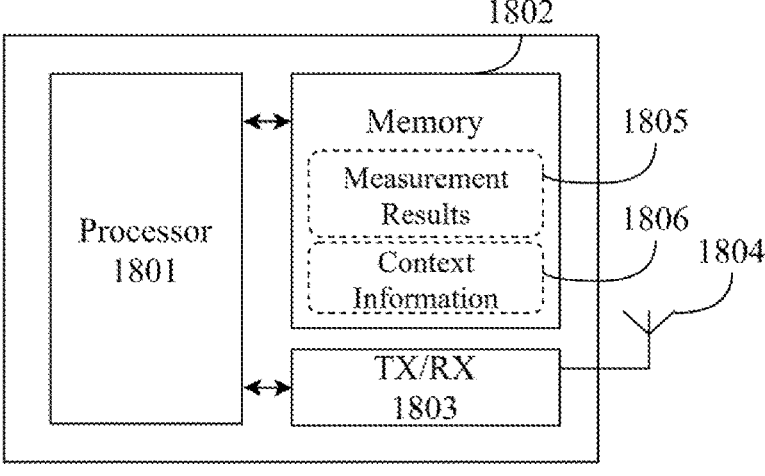
FIG. 18 shows an example of a device according to various examples in this disclosure.

FIG. 18 shows an example of a device according to various examples in this disclosure. The device is depicted as a radio communication device in this illustrative example, comprising a processor 1801, a memory 1802, and a transceiver 1803 configured to receive and transmit radio communication signals using an antenna element 1804. The illustration depicts that there is one antenna element coupled to the transceiver 1803, however, this should not be considered as limiting, and the radio communication device may be coupled to any number of antenna elements. The transceiver 1803 may include a plurality of antenna ports couplable to the plurality of antenna elements. The processor 1801 may include one or more processors which may include a baseband processor and an application processor.

The memory 1802 may be configured to store one or more measurement results 1805 indicating measurements of received radio communication signals from another device. In various examples, the radio communication signals may include downlink radio communication signals received by a UE from a BS. In various examples, the radio communication signals may include uplink radio communication signals received by a BS from a UE. The device may include a measurement circuit to measure the received radio communication signals to obtain the one or more measurement results 1805. The transceiver 1803 may include the measurement circuit according to the configuration of the device in which the measurement circuit may measure the received uplink radio communication signals and/or the received downlink radio communication signals.

The measurement circuit may measure the received radio communication signals based on in-phase and quadrature samples (IQ samples). Accordingly, the one or more measurement results 1805 may include information (e.g. power) of the IQ samples for one or more received radio communication signals. The measurement circuit may generate a plurality of fast Fourier transform (FFT) sample values based on the received radio communication signals. Accordingly, the one or more measurement results 1805 may include information of the plurality of FFT samples of on one or more received radio communication signals. The measurement circuit may measure power of a received radio communication signal over a defined bandwidth, and the processor 1801 may obtain reference signal received power (RSRP), a received signal strength indicator (RSSI), or reference signal received quality (RSRQ) values based on the measured power. Accordingly, the one or more measurement results 1805 may include RSRPs, RSSIs, and/or RSRQs, or any other forms of processed signals.

The processor 1801 may determine a transmission power parameter based on the one or more measurement results 1805 using a trained machine learning model. The processor 1801 may provide the one or more measurement results 1805 to an input of a trained artificial intelligence/machine learning model (AI/ML). The AI/ML may be configured to provide an output including a transmission power parameter based on the input of the AI/ML. In various examples, the transmission power parameter may include a predicted transmission power parameter. The processor 1801 may implement the AI/ML based on a plurality of machine model parameters stored in the memory, or provide the one or more measurement results 1805 to an external processor or an external computing device that is configured to implement the AI/ML as provided in this disclosure. The processor 1801 may include an accelerator or a neuromorphic processor to implement the AI/ML.

In various examples, the memory 1802 may further store context information 1806 including information representing a plurality of attributes with respect to the device and the radio connection between the device and the other communication device. The context information 1806 may include attributes in which the device performed the one or more measurements, or attributes in which the device operates in an established radio connection with the other communication device.

The processor 1801 may generate the context information 1806 according to operations of the device when the device is connected to the other communication device over the radio connection. The processor 1801 may access the required information for the context information 1806 through various sources, such as RRC configuration messages exchanged between the BS and the UE, Medium Access Layer (MAC) information exchanged between the BS and the UE, UE information that is stored in a memory (e.g. the memory 1802), application related information from running applications, etc. The processor 1801 may access the information that is stored in the memory 1802 for other operations to obtain the information with respect to the context information 1806 when it is desired and perform operations as provided in this disclosure. At least for the context information 1806 that the processor 1801 may generate, the processor 1801 may further store a time information for the respective attribute. The time information may indicate the instance of time that the processor 1801 has generated the respective portion of the context information 1806, or the instance of time that the processor 1801 respective portion of the context information 1806 relates to. Furthermore, once the respective AI/ML provides an output, the processor 1801 may perform various actions with respect to the output of the AI/ML.

Figure 19:
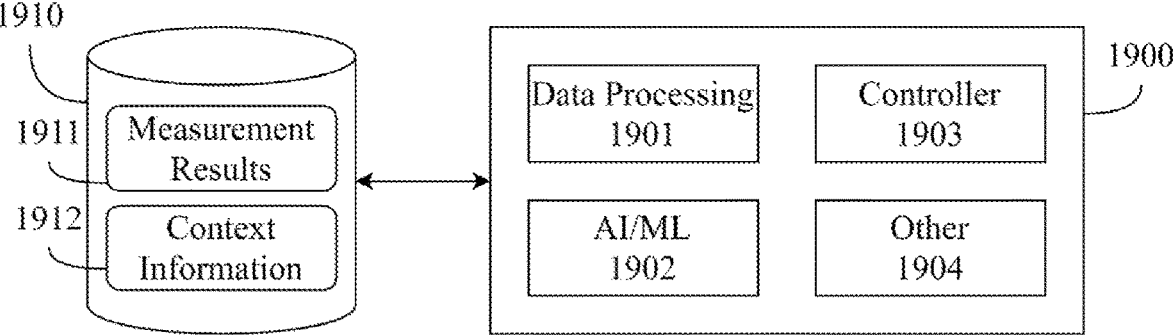
FIG. 19 shows an example of a processor and a memory of a device according to various aspects provided in this disclosure.

FIG. 19 shows an example of a processor and a memory of a device according to various aspects provided in this disclosure. The processor 1900 is depicted to include various functional modules that are configured to provide various functions respectively. The skilled person would recognize that the depicted functional modules are provided to explain various operations that the processor 1900 is configured to. Similarly, the memory 1910 is depicted to include the measurement results 1911 and the context information 1912 as blocks, however, the memory may store the measurement results 1911 and the context information 1912 in any kind of configuration, which may further be provided in this disclosure. Furthermore, the AI/ML module 1902 is depicted as it is implemented in the processor 1900 only as an example, and any type of AI/ML implementations which may include the implementation of the AI/ML module

1902 in an external processor, such as an accelerator, a graphics processing unit (GPU), a neuromorphic chip, or in a cloud computing device, or in a memory (e.g. the memory 1910) may also be possible according to any methods.

The processor 1900 may include a data processing module 1901 that is configured to process the data and generate at least a portion of the measurement results 1911 and/or the context information 1912 as provided in various examples in this disclosure. In various examples, the measurement results 1911 and the context information 1912 may include information for the past operations that the device has performed in the past for at least within a period of time in a plurality of instances of time. The data processing module 1901 may generate a portion oft the measurement results 1911 and the context information 1912 according to the operations of the device. The measurement results 1911 may include one measurement result (e.g. the latest measurement result) along with the context information 1912.

As an example, the data processing module 1901 may track the measurements that a measurement circuit may perform and store the results of the measurements as the measurements results 1911. Furthermore, the data processing module 1901 may access information directly for a portion of context information 1912 that is already stored in the memory 1910 for operations of other entities. For example, the memory 1910 may include already the information related to the UE (e.g. battery level, location, etc.) for other operations, so the data processing module 1901 may not generate the same information to regard that particular information as the context information 1912.

The data processing module 1901 may obtain the information to be used as the context information 1912 based on exchanged messages between the BS and the UE. In case the device is implemented in a BS, the data processing module 1901 may obtain various information from messages received from the respective UE. In case the device is implemented in a UE, the data processing module 1901 may obtain various information from messages received from the respective BS.

The context information 1912 may include information with respect to a plurality of attributes about the device and activities of the device. The context information 1912 may include information which the AI/ML module 1902 may use to determine a transmit power parameter, and especially to predict a transmit power to be used for the radio communication between the device and the other device. For example, the context information 1912 may include a nominal power with respect to the communication channel.

Based on the type of the power control, the nominal power may include the PRACH target power. The data processing module 1901 may obtain the PRACH target power with respect to the corresponding RRC configuration (e.g. the latest RRC configuration), and/or PRACH target power values used in previous open-loop power control for the corresponding BS (i.e. from previous RRC configurations). The context information 1912 may further include a path loss compensation parameter. The data processing module 1901 may obtain the path loss compensation parameter based on the corresponding RRC configuration or from a plurality of previous RRC configurations. Such parameters may provide insight for the AI/ML module 1902 for determination of a transmit power parameter.

Furthermore, the context information 1912 may include information indicating the location of the device, in particular the location of the device relative to the other communication device (e.g. location of the UE relative to the BS). In case the device is implemented in a UE, the location may include the current location of the UE. In case the device is implemented in a BS, the location may include a received location of the UE. The location information may provide an insight for the AI/ML module 1902 to consider the distance between the UE and the BS, since the distance may affect the transmit power. In various examples, the context information 1912 may include a plurality of locations for a plurality of instances of time. Furthermore, the context information 1912 may include a velocity with respect to the UE.

Furthermore, the context information 1912 may include an identifier for a network operator operating through the BS, or an identifier of the BS, since such information may also provide an insight to the AI/ML module 1902 for the desired receive power on the BS side. Furthermore, the context information 1912 may include mode information representing the mode of the radio communication network. Furthermore, the context information 1912 may include a measured downlink or uplink rate for a period of time.

Furthermore, the context information 1912 may include modulation level information indicating the order of the modulation for the radio communication. The data processing module 1901 may obtain the modulation level information with respect to the corresponding RRC configuration (e.g. the latest RRC) or with respect to a plurality of past RRC configurations. Furthermore, the context information 1912 may include one or more previous transmit power levels used for the radio connection.

The context information 1912 may also include a number of resource blocks allocated for the UE, or a number of retransmissions to transmit radio communication signals to the BS. Furthermore, the context information 1912 may also include one or more channel quality indicators (CQI) for communication channels between the UE and the BS.

The AI/ML module 1902 may implement the AI/ML. The AI/ML module 1902 may receive input data including the measurement results 1911 and the context information 1912, and the AI/ML module 1902 may determine a transmission power parameter for the radio connection between the UE and the BS based on the input data. The processor 1900 may further include a controller 1903 to control the AI/ML module 1902. The controller 1903 may provide the input data to the AI/ML module 1902, or provide the AI/ML module 1902 instructions to perform the prediction.

Furthermore, the controller 1903 may control the AI/ML module 1902 according to a predefined event. For example, the controller 1903 may provide instructions to the AI/ML module 1902 to perform the AI/ML algorithm based on the battery level of the device, such as when the battery level is above a predefined threshold. Furthermore, the controller 1903 may provide instructions to the AI/ML module 1902 to operate in a low power mode in which the AI/ML module 1902 does not perform the AI/ML algorithm when the device is being charged.

Furthermore, the processor 1900 may include a data module to implement other processing functions 1904 associated with other functions of the device (e.g. baseband modem 206, application processor 212, or other one or more processors as provided with respect to FIG. 2).

Furthermore, the controller 1903 may determine the context information 1912 that the AI/ML module 1902 receives as the input data. In various examples, the input data of the AI/ML module 1902 may include different attributes for different configurations. For example, the AI/ML module 1902 may be configured to determine a first output based on a first input data in a first configuration, and the AI/ML module 1902 may be configured to determine a second output based on a second input data in a second configuration. The AI/ML module 1902 may include a first AI/ML operating in the first configuration and a second AI/ML operating in the second configuration. Accordingly, the controller 1903 may control the AI/ML module 1902 to operate in a configuration.

Figure 20:
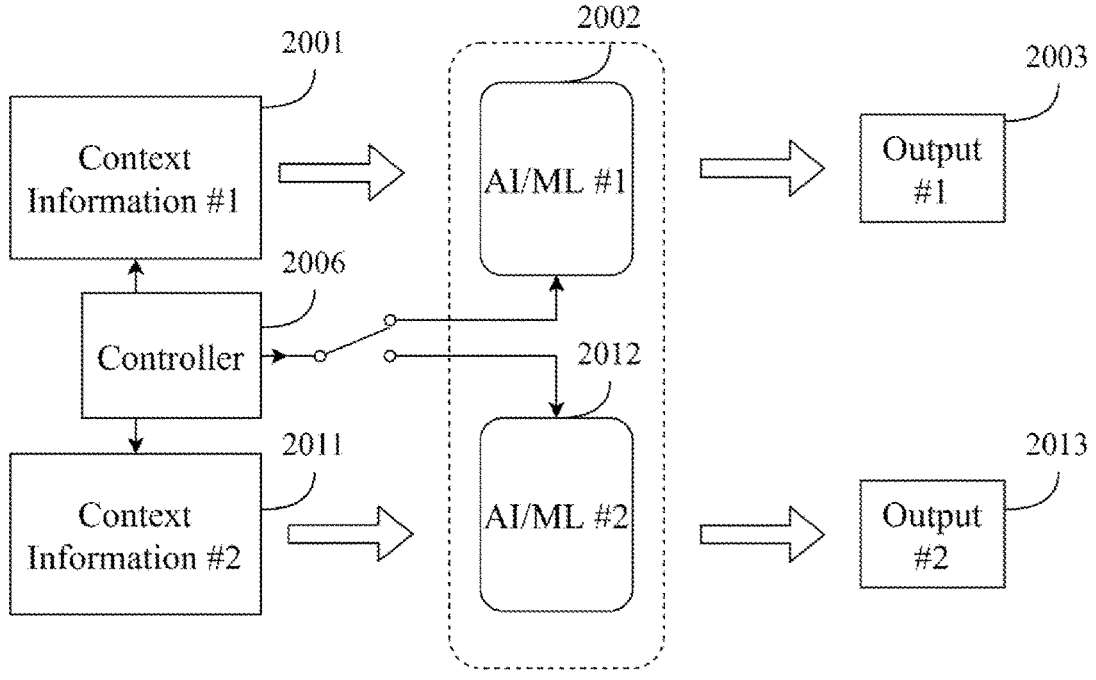
FIG. 20 exemplarily shows an illustration with respect to a controller.

FIG. 20 exemplarily shows an illustration with respect to the controller. The controller 2006 may control the AI/ML module in a configuration that the AI/ML module implements a first AI/ML in a first configuration and a second AI/ML in a second configuration according to the control of the controller 2006. For example, the first AI/ML 2002 may be trained to determine a transmission power parameter for an open-loop power control configuration and the second AI/ML 2012 may be trained to determine a transmission power parameter for a closed-loop power control. In various examples, the first AI/ML 2002 and the second AI/ML 2012 may be implemented by one AI/ML with different AI/ML model parameters, and the controller 2006 may determine which model parameters are to be used by the one AI/ML based on a received instruction (e.g. from other processing modules). The input data for both AI/ML includes measurement results (not shown).

Accordingly, the controller 2006 may also provide the context information to the respective AI/ML in different configurations. For example, the first context information 2001 may include information indicating nominal power(s), path loss compensation parameter(s), and mobility of the device. Accordingly, the input data of the first AI/ML 2002 may include the first context information 2001 and the measurement results, and the first AI/ML 2002 may provide a first output 2003 indicating a predicted transmit power parameter (e.g. transmit power value) to be used for an open-loop power control.

The second context information 2011 may include information indicating nominal power(s), path loss compensation parameter(s), modulation level(s), previous power level(s), number of resource block(s), mobility of the device, number of retransmissions, and CQI(s). Accordingly, the input data of the second AI/ML 2012 may include the second context information 2011 and the measurement results, and the second AI/ML 2012 may provide a second output 2013 indicating a predicted transmit power parameter (e.g. transmit power value) to be used for a closed-loop power control.

Figure 21:
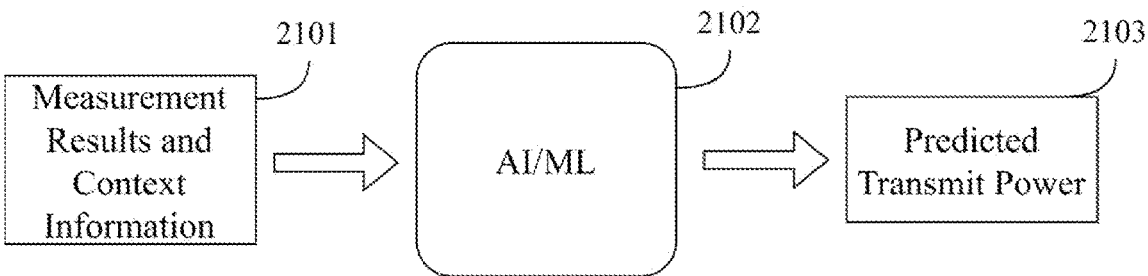
FIG. 21 shows an example of an AI/ML.

FIG. 21 shows an example of an AI/ML which the AI/ML module 1902 may implement. The AI/ML 2102 may be any type of machine learning model configured to receive the input data 2101 including the measurement results and the context information and provide an output 2103 indicating a predicted transmit power. The AI/ML 2102 may be trained to provide an output 2103 indicating a power headroom. The AI/ML 2102 may include any type of machine learning model suitable for the purpose. The AI/ML 2102 may include a neural network, including various types of neural networks. The neural network may be a feed-forward neural network in which the information is transferred from lower layers of the neural network close to the input to higher layers of the neural network close to the output. Each layer includes neurons that receive input from a previous layer and provide an output to a next layer based on certain weight parameters adjusting the input information.

The AI/ML 2102 may include a convolutional neural network (CNN), which is an example for feed-forward neural networks that may be used for the purpose of this disclosure, in which one or more of the hidden layers of the neural network include a convolutional layer that performs convolutions for their received input from a lower layer. The CNNs may be helpful for pattern recognition and classification operations. The CNN may further include pooling layers, fully connected layers, and normalization layers.

The AI/ML 2102 may include a recurrent neural network in which the neurons transfer the information in a configuration that the neurons may transfer the input information to a neuron of the same layer. Recurrent neural networks (RNNs) may help to identify patterns between a plurality of input sequences, and accordingly, RNNs may identify temporal pattern provided as a time-series data and perform predictions based on the identified temporal patterns. In various examples of RNNs, long short-term memory (LSTM) architecture may be implemented. The LSTM networks may be helpful to perform classifications, and processing, and predictions using time series data.

In various examples, the neural network may be configured in top-down configuration in which a neuron of a layer provides output to a neuron of a lower layer, which may help to discriminate certain features of an input.

The AI/ML 2102 may include a reinforcement learning model. The reinforcement learning model may be modeled as a Markov decision process (MDP). The MDP may determine an action from an action set based on a previous observation which may be referred to as a state. In a next state, the MDP may determine a reward based on the next state and the previous state. The determined action may influence the probability of the MDP to move into the next state. Accordingly, the MDP may obtain a function that maps the current state to an action to be determined with the purpose of maximizing the rewards.

The AI/ML 2102 may include a trained AI/ML 2102 that is configured to predict a transmit power (or provide output as provided in various examples in this disclosure) based on the input data including training measurement results and context information. The trained AI/ML 2102 may be obtained via an online and/or offline training. For the offline training, a training agent may train the AI/ML 2102 based on conditions of the device including the constraints of the device (e.g. battery constraints, power constraints), category of the device, UE capabilities, etc. in a past instance of time. Furthermore, the training agent may train the AI/ML 2102 (e.g. by adjusting the machine learning model parameters stored in the memory) using online training methods based on the latest (or actual) implementation conditions, such as the location of the device, etc. Furthermore, the processor may further optimize the AI/ML 2102 based on previous inference results including the determined parameter, and possibly based on a performance metric with respect to the predicted transmit power and the effect of transmissions with the predicted transmit power (e.g. throughput of the radio communication signal transmitted with the predicted transmit power, or a total energy, or a number of retransmissions, or radio link failures, etc.).

The training agent may train the AI/ML 2102 according to the desired outcome. The training agent may provide the training data to the AI/ML 2102 to train the AI/ML 2102. The training data may include input data with respect to simulated operations. The training data may include training measurement results and context information generated in response to other communication activities. In various examples, the training agent may obtain the training data based on transmissions or transmit power controls performed in various conditions, such as various distances to the BS, various application conditions and QoS requirements, different terrains, different user behaviors, and patterns, etc. The training agent may store the information obtained from the transmissions performed in such conditions to obtain the training data.

In one example, the AI/ML 2102 may obtain training data that the device may receive from another communication device (e.g. the other communication device, BS) and decode including information indicating one or more measurements, determined or predicted transmit power levels with respect to the one or more measurements, determined or predicted transmit power parameters with respect to the one or more measurements, set transmit power levels in response to the predicted transmit power levels, a number of transmissions or a number of retransmissions with respect to the set transmit power levels, radio link failures with respect to the set transmit power levels. Accordingly, the training agent may train the AI/ML 2102 with the obtained training data.

In one example, the processor 1900 may encode information to be transmitted to another communication device including information indicating one or more measurements, determined or predicted transmit power levels with respect to the one or more measurements, determined or predicted transmit power parameters with respect to the one or more measurements, set transmit power levels in response to the predicted transmit power levels, a number of transmissions or a number of retransmissions with respect to the set transmit power levels, radio link failures with respect to the set transmit power levels, so that either the another communication device may use the information as training data, or optimize the training data that the another communication device stores.

The processor 1900 may implement the training agent, or another entity that may be communicatively coupled to the processor 1900 may include the training agent and provide the training data to the device, so that the processor 1900 may train the AI/ML. In various examples, the device may include the AI/ML in a configuration that it is already trained (e.g. the machine model parameters in the memory are set). It may desirable for the AI/ML 1902 itself to have the training agent, or a portion of the training agent, in order to perform optimizations according to the output of the inferences to be performed as provided in this disclosure. The AI/ML module 1902 may include an execution module and a training module that may implement the training agent as provided in this disclosure for other examples.

In various examples, the measurement results and the context information may include a time-series data indicating the attributes and measurement results for a plurality of instances of time arranged consecutively, for example in a configuration provided in FIG. 9. An LSTM network may include a network of LSTM cells that may process the attributes provided for an instance of time from the input according to the attributes provided for the instance of time and one or more previous outputs of the LSTM that have taken in place in previous instances of time, and accordingly, obtain the output. The number of the one or more previous inputs may be defined by a window size. In various examples, the window size may be 10 and each instance of time may correspond to discrete time steps of 1 ms according to the time-series data, however, these numbers have been provided as an example, and it may be arranged according to the processing, memory, and time constraints and the input data.

In this illustrative example, the LSTM network may process the features corresponding to the attributes (e.g. feature vectors obtained from the attributes) that the measurement results and the context information include and determine a label for each instance of time according to the features. A predictor may accordingly predict the transmit power parameter based on the features of the window size.

The predictor may predict the transmit power parameter for one or more instances of time. The predictor may further provide an output indicating a confidence score with respect to the prediction (e.g. the probability of the predicted transmit power parameter). The skilled person would understand that the machine model parameters with respect to the LSTM (or any other examples of AI/ML as provided in this disclosure) are to be selected to give the desired performance. Such parameters may include weights and activation functions. Various metrics, including the throughput of the radio communication signal transmitted with the predicted transmit power, or a total energy for the transmitted radio communication signal, or a number of retransmissions, or a number of radio link failures, and such may be used to optimize the machine model parameters.

Figure 22:
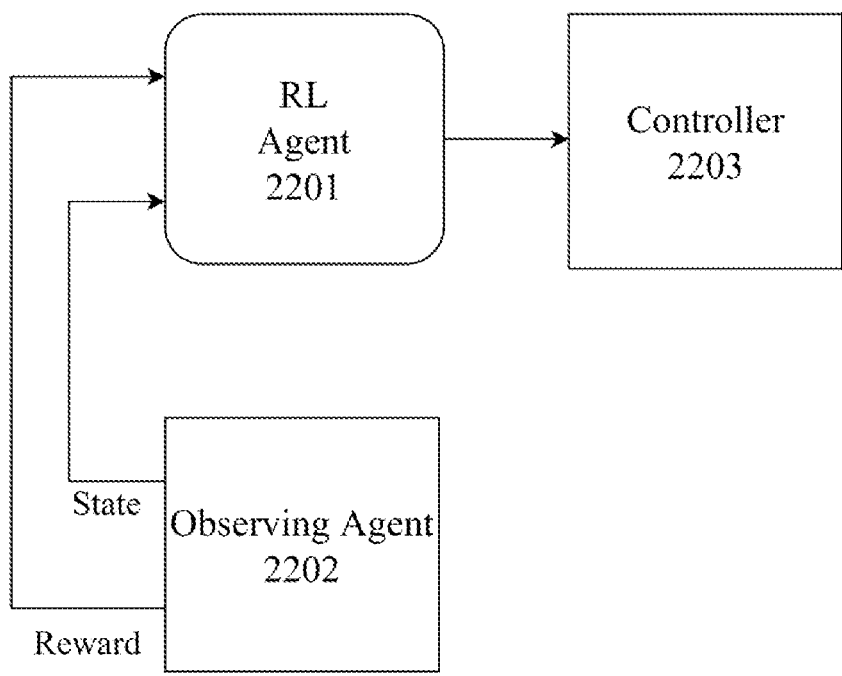
FIG. 22 shows an exemplary representation of a reinforcement learning model based AI/ML.

FIG. 22 shows an exemplary representation of a reinforcement learning model based AI/ML. A reinforcement learning agent (RL agent) 2201 may determine an action based on a first state that the measurement results and the context information 2202 represents at a first instance of time and a reward provided for the first instance of time with respect to a transition from a previous instance of time and the first instance of time. For example, the RL agent 2201 may select a transmit power level from a set of predefined transmit power levels (e.g. either randomly or the transmit power level with the best reward). Accordingly, the RL agent 2201 may provide an indication of the selected transmit power level to a controller 2203, and the controller 2203 may accordingly set the transmit power level for the transmission.

Furthermore, the RL agent 2201 may determine a reward based on the selected transmit power level in the first instance time and a state indicated at a second instance of time. The RL agent 2201 may receive the reward based on at least one of the throughput of the transmitted radio communication signal with the selected transmit power level or a total transmit energy with the selected transmit power level. In various examples, an observing agent 2202 may determine the reward based on the communication and provide the reward to the RL agent 2201. Accordingly, the RL agent 2201 may obtain the capability to map the states that the measurement results and the context information indicate to the transmit power levels with a goal to minimize the number of retransmissions, or maximizing the throughput, or minimizing the total energy.

In one example, the RL agent 2201 may implement a Q-learning to learn the value of the selected transmit power level in the particular state according to a Q-function based on AI/ML parameters. The Q-function may be represented with an equation:

$$Q_{new}(s_t,a_t) \leftarrow (1-\alpha)Q(s_t,a_t)+\alpha(r+\gamma \max a(Q(s_t+1),a))$$

In the Q-function equation, s representing the state and a representing the action, indicating all state-action pairs with an index t, the new Q value of the corresponding state-action pair t is based on the old Q value for the state-action pair t and the sum of the reward r obtained by taking action at in the state st with a discount rate $\gamma$ that is between 0 and 1, in which the weight between the old Q value and the reward portion is determined by the learning rate $\alpha$. In this illustrative example, the observing agent 2202 may determine the reward portion based on the throughput of the transmitted radio communication signal with the selected transmit power level or a total transmit energy for the selected transmit power level. During the training process, the learning rate $\alpha$ and the discount rate $\gamma$ are to be chosen appropriately to optimize the performance.

Figure 23:
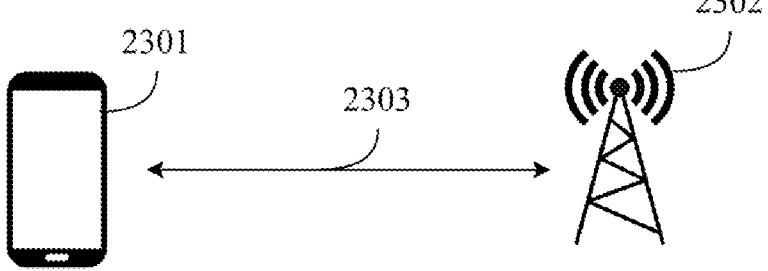
FIG. 23 exemplarily shows an illustration including a UE and a BS.

FIG. 23 exemplarily shows an illustration including a UE and a BS. The UE 2301 may include the device according to various aspects of this disclosure. The UE 2301 may be in an RRC_CONNECTED mode to the BS 2302 over a radio connection 2303. The UE 2301 may measure the received downlink radio communication signals from the BS (e.g. SSBs or CSI-RSs) to obtain one or more measurement results. Furthermore, the UE 2301 may obtain the context information is provided in this disclosure. The processor of the UE 2301 may provide the input including the one or more measurement results, and optionally the context information to an AI/ML to receive an output including a predicted transmit power level.

The UE 2301 may set a transmit power level based on a comparison of the predicted transmit power level with a maximum transmit power level that the UE 2301 may transmit radio communication signal. The UE 2301 may perform an open-loop power control according to the predicted transmit power level. For example, if the predicted transmit power level is less than the maximum transmit power level, the UE 2301 may transmit a PRACH preamble with the predicted transmit power level according to an open-loop power control configuration.

The UE 2301 may further encode information indicating a power headroom for the UE 2301 according to the predicted transmit power level in an open-loop power control configuration. In one example, the AI/ML of the UE 2301 may be configured to provide an output indicating the power headroom for the UE 2301. The UE 2301 may encode a MAC layer control element (MAC CE) indicating the power headroom for a transmission to the BS 2302. The processor of the UE 2301 may calculate the power headroom based on the maximum transmit power level, a current or most recent transmit power for transmissions to the BS 2302, the predicted transmit power level and a number of resource blocks that the BS 2302 allocated for the UE 2301.

The UE 2301 may predict a transmit power level to be used in a closed-loop power control and the UE 2301 may perform the closed-loop power control based on the predicted transmit power level for the closed-loop power control. Accordingly, the UE 2301 may further send a PHR to the BS 2302 based on the predicted transmit power level for the closed-loop power control. In various examples, the UE 2301 may send PHRs to the BS 2302 in various intervals between two consecutive requests of the BS 2302 with respect to a PHR from the UE 2301.

In various aspects, the BS 2302 may include the device according to various aspects of this disclosure. The UE 2301 may be in an RRC_CONNECTED mode to the BS 2302 over the radio connection 2303. The BS 2302 may measure the received uplink radio communication signals from the UE to obtain one or more measurement results. Furthermore, the BS 2302 may obtain the context information as provided in this disclosure. The processor of the BS 2302 may provide the input including the one or more measurement results, and optionally the context information to an AI/ML to receive an output including a predicted transmit power level for the UE 2301.

The BS 2302 may predict a transmit power level that the UE 2301 is predicted to use in a closed-loop power control and the based on the calculations, the BS 2302 may encode a TPC to the UE 2301 based on the predicted transmit power level for the UE 2301. Accordingly, the UE 2301 may control the transmit power level based on the TPC that the BS 2302 encodes according to the predicted transmit power level.

FIG. 24 shows an example of a method. The method may include storing 2401 a one or more measurement results indicating measurements of received communication signals, providing 2402 the one or more measurement results to a trained machine learning module configured to determine a transmission power parameter based on the one or more measurement results, setting 2403 a transmit power to transmit uplink communication signals based on the determined transmission power parameter. A non-transitory computer-readable medium may include one or more instructions that, if executed by a processor, cause the processor to perform the method.

Figure 25:
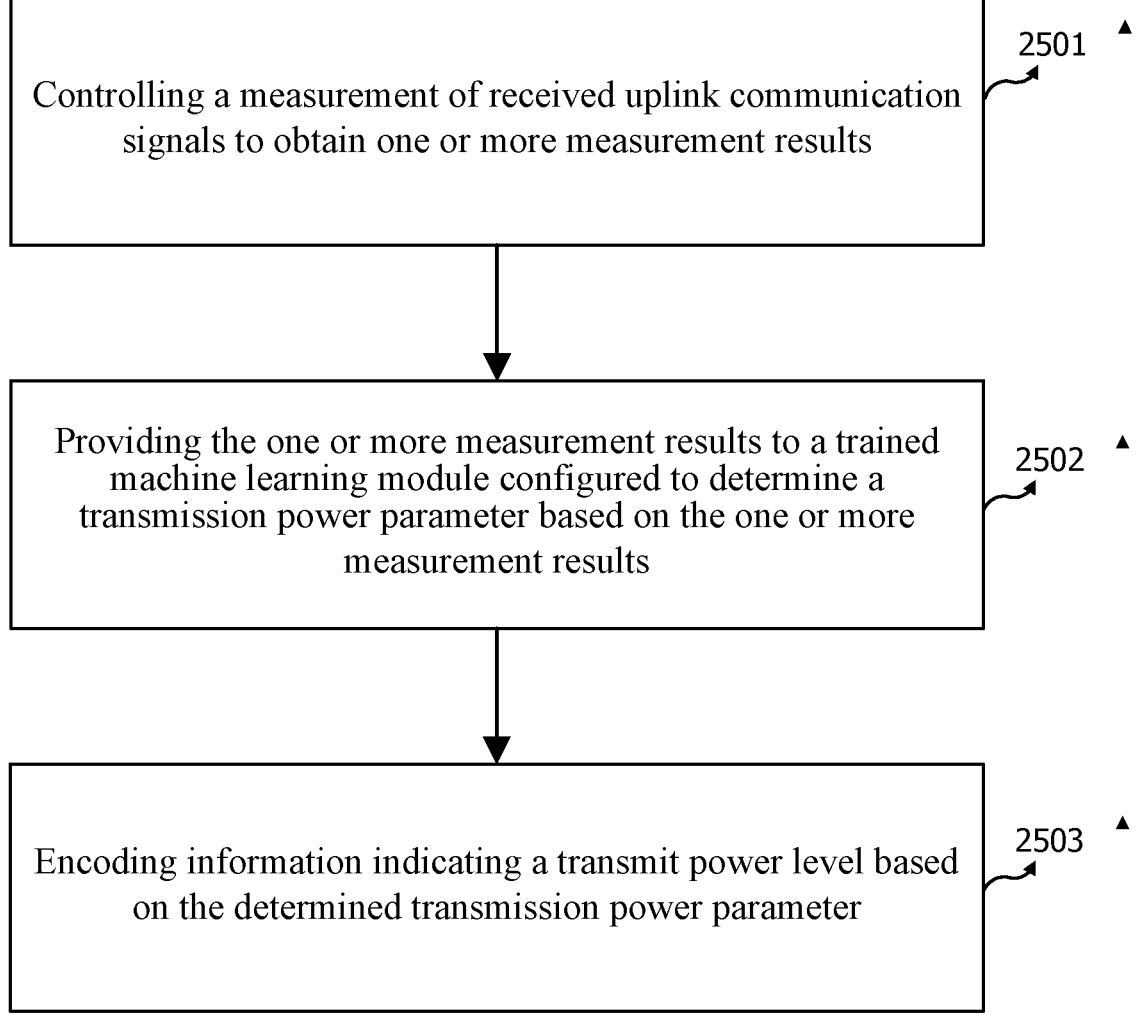
FIG. 25 shows an example of a method.

FIG. 25 shows an example of a method. The method may include controlling 2501 a measurement of received uplink communication signals to obtain one or more measurement results, providing 2502 the one or more measurement results to a trained machine learning module configured to determine a transmission power parameter based on the one or more measurement results, encoding 2503 information indicating a transmit power level based on the determined transmission power parameter. A non-transitory computer-readable medium may include one or more instructions which, if executed by a processor, cause the processor to perform the method.

Figure 26:
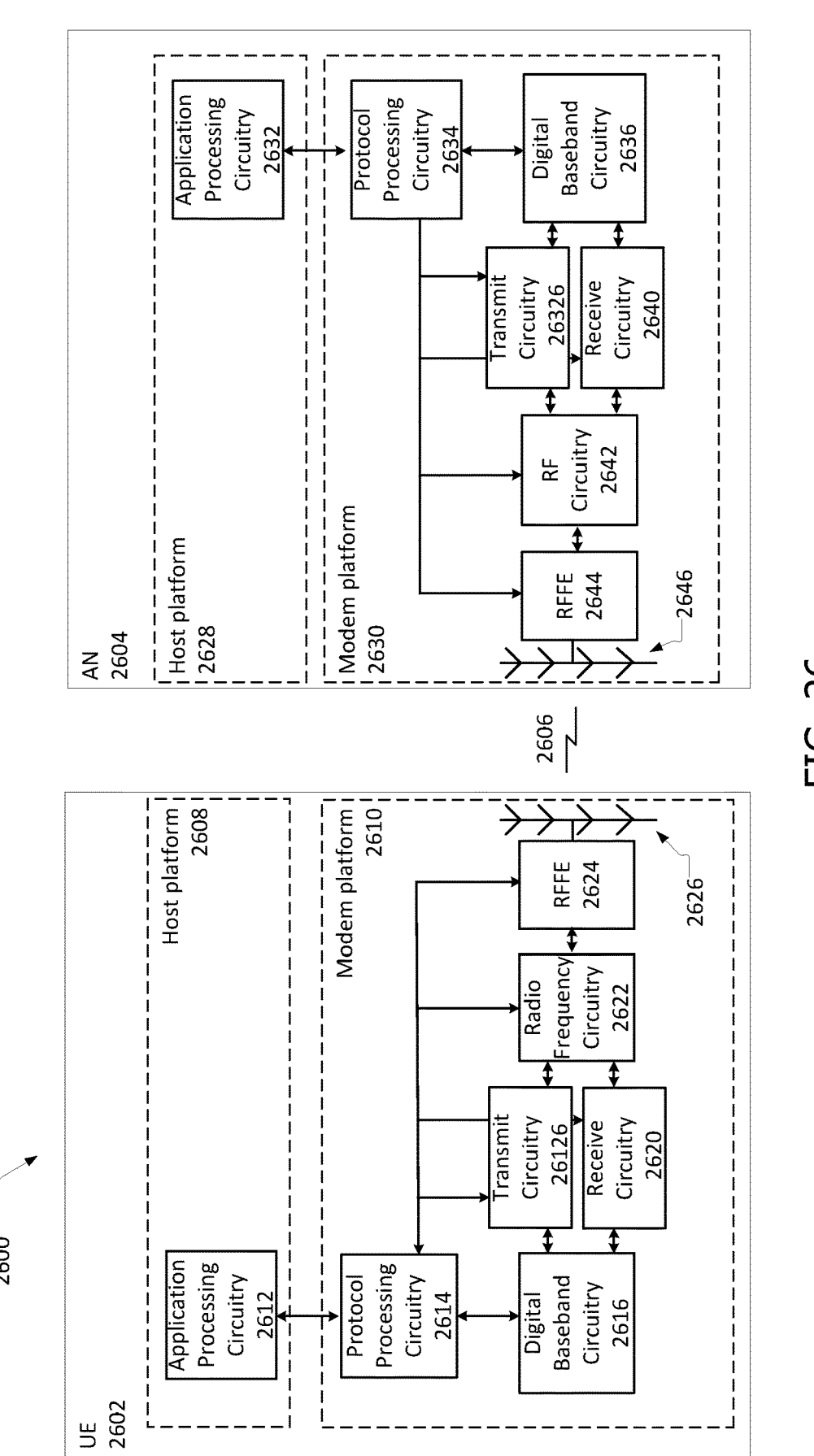
FIG. 26 illustrates an exemplary wireless network.

FIG. 26 illustrates a wireless network 2600 in accordance with various aspects. The wireless network 2600 may include a UE 2602 in wireless communication with an AN 2604. The UE 2602 and AN 2604 may be similar to, and substantially interchangeable with, like-named components described elsewhere herein.

The UE 2602 may be communicatively coupled with the AN 2604 via connection 2606. The connection 806 is illustrated as an air interface to enable communicative coupling, and can be consistent with cellular communications protocols such as an LTE protocol or a 5G NR protocol operating at mmWave or sub-6GHz frequencies.

The UE 2602 may include a host platform 2608 coupled with a modem platform 2610. The host platform 2608 may include application processing circuitry 2612, which may be coupled with protocol processing circuitry 2614 of the modem platform 2610. The application processing circuitry 2612 may run various applications for the UE 2602 that source/sink application data. The application processing circuitry 2612 may further implement one or more layer operations to transmit/receive application data to/from a data network. These layer operations may include transport (for example user datagram protocol (UDP)) and Internet (for example, internet protocol (IP)) operations The protocol processing circuitry 2614 may implement one or more of layer operations to facilitate transmission or reception of data over the connection 2606. The layer operations implemented by the protocol processing circuitry 2614 may include, for example, MAC, RLC, PDCP, RRC and NAS operations.

The modem platform 2610 may further include digital baseband circuitry 2616 that may implement one or more layer operations that are "below" layer operations performed by the protocol processing circuitry 2614 in a network protocol stack. These operations may include, for example, physical layer (PHY) operations including one or more of hybrid automatic repeat request (HARQ)-acknowledgment (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 2610 may further include transmit circuitry 2618, receive circuitry 2620, RF circuitry 2622, and RF front end (RFFE) 2624, which may include or connect to one or more antenna panels 2626. Briefly, the transmit circuitry 2618 may include a digital-to-analog converter, mixer, intermediate frequency (IF) components, etc.; the receive circuitry 2620 may include an analog-to-digital converter, mixer, IF components, etc.; the RF circuitry 2622 may include a low-noise amplifier, a power amplifier, power tracking components, etc.; RFFE 2624 may include filters (for example, surface/bulk acoustic wave filters), switches, antenna tuners, beamforming components (for example, phase-array antenna components), etc. The selection and arrangement of the components of the transmit circuitry 2618, receive circuitry 2620, RF circuitry 2622, RFFE 2624, and antenna panels 2626 (referred generically as "transmit/receive components") may be specific to details of a specific implementation such as, for example, whether communication is time division multiplexing (TDM) or frequency division multiplex (FDM), in mmWave or sub-6 gHz frequencies, etc. In some aspects, the transmit/receive components may be arranged in multiple parallel transmit/ receive chains, may be disposed in the same or different chips/modules, etc.

In some aspects, the protocol processing circuitry 2614 may include one or more instances of control circuitry (not shown) to provide control functions for the transmit/receive components.

A UE reception may be established by and via the antenna panels 2626, RFFE 2624, RF circuitry 2622, receive circuitry 2620, digital baseband circuitry 2616, and protocol processing circuitry 2614. In some aspects, the antenna panels 2626 may receive a transmission from the AN 2604 by receive-beamforming signals received by a plurality of antennas/antenna elements of the one or more antenna panels 2626.

A UE transmission may be established by and via the protocol processing circuitry 2614, digital baseband circuitry 2616, transmit circuitry 2618, RF circuitry 2622, RFFE 2624, and antenna panels 2626. In some aspects, the transmit components of the UE 2604 may apply a spatial filter to the data to be transmitted to form a transmit beam emitted by the antenna elements of the antenna panels 2626.

Similar to the UE 2602, the AN 2604 may include a host platform 2628 coupled with a modem platform 2630. The host platform 2628 may include application processing circuitry 2632 coupled with protocol processing circuitry 2634 of the modem platform 2630. The modem platform may further include digital baseband circuitry 2636, transmit circuitry 2638, receive circuitry 2640, RF circuitry 2642, RFFE circuitry 2644, and antenna panels 2646. The components of the AN 2604 may be similar to and substantially interchangeable with like-named components of the UE 2602. In addition to performing data transmission/reception as described above, the components of the AN 2608 may perform various logical functions that include, for example, radio network controller (RNC) functions such as radio bearer management, uplink and downlink dynamic radio resource management, and data packet scheduling.

Figure 27:
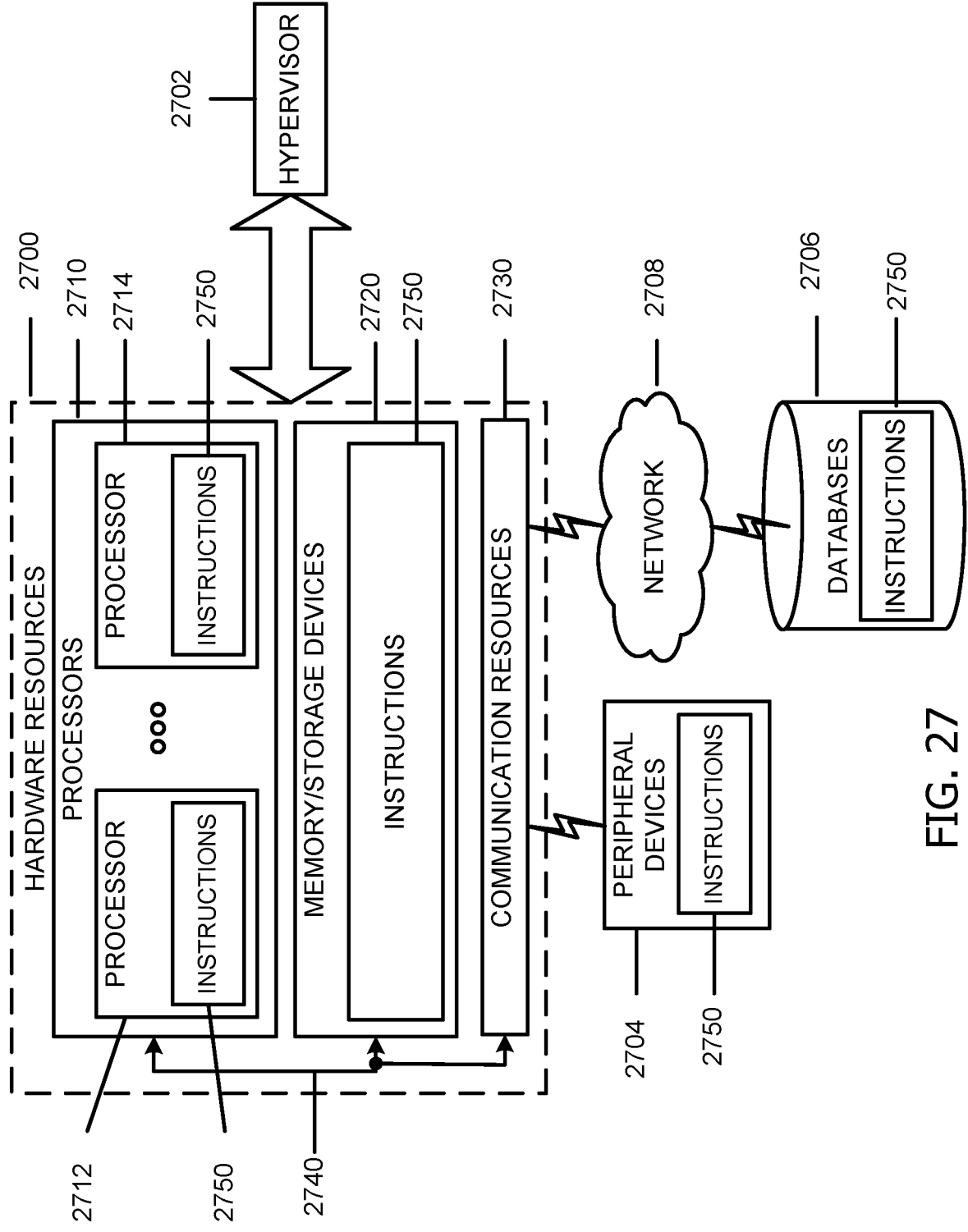
FIG. 27 is a block diagram illustrating components, according to some example aspects.

FIG. 27 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 27 shows a diagrammatic representation of hardware resources 2700 including one or more processors (or processor cores) 2710, one or more memory/storage devices 2720, and one or more communication resources 2730, each of which may be communicatively coupled via a bus 2740 or other interface circuitry. For aspects where node virtualization (e.g., NFV) is utilized, a hypervisor 2702 may be executed to provide an execution environment for one or more network slices/sub-slices to utilize the hardware resources 2700.

The processors 2710 may include, for example, a processor 2712 and a processor 2714. The processors 2710 may be, for example, a central processing unit (CPU), a reduced instruction set computing (RISC) processor, a complex instruction set computing (CISC) processor, a graphics processing unit (GPU), a digital signal processer (DSP) such as a baseband processor, an application-specific integrated circuit (ASIC), an field-programmable gate array (FPGA), a radio-frequency integrated circuit (RFIC), another processor (including those discussed herein), or any suitable combination thereof.

The memory/storage devices 2720 may include main memory, disk storage, or any suitable combination thereof. The memory/storage devices 2720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2730 may include interconnection or network interface controllers, components, or other suitable devices to communicate with one or more peripheral devices 2704 or one or more databases 2706 or other network elements via a network 2708. For example, the communication resources 2730 may include wired communication components (e.g., for coupling via USB, Ethernet, etc.), cellular communication components, NFC components, Bluetooth® (or Bluetooth® Low Energy) components, Wi-Fi® components, and other communication components.

Instructions 2750 may include software, a program, an application, an applet, an app, or other executable code for causing at least any of the processors 2710 to perform any one or more of the methodologies discussed herein. The instructions 2750 may reside, completely or partially, within at least one of the processors 2710 (e.g., within the processor's cache memory), the memory/storage devices 2720, or any suitable combination thereof. Furthermore, any portion of the instructions 2750 may be transferred to the hardware resources 2700 from any combination of the peripheral devices 2704 or the databases 2706. Accordingly, the memory of processors 2710, the memory/storage devices 2720, the peripheral devices 2704, and the databases 2706 are examples of computer-readable and machine-readable media. In various examples, a non-transitory computer-readable medium including one or more instructions which, if executed by a processor, cause the processor to: access environment information including an indication of an amount of a crowd of road users intersecting with a predetermined route of a vehicle in a road environment, prioritize an anticipated movement of at least one road user of the crowd of road users relative to a predicted movement of the vehicle within the predetermined route based on the amount of the crowd of road users; and determine an action to be taken by the vehicle allowing the anticipated movement of the at least one road user of the crowd of road users. The one or more instructions may further cause the processor to act as provided in this disclosure.

Figure 28:
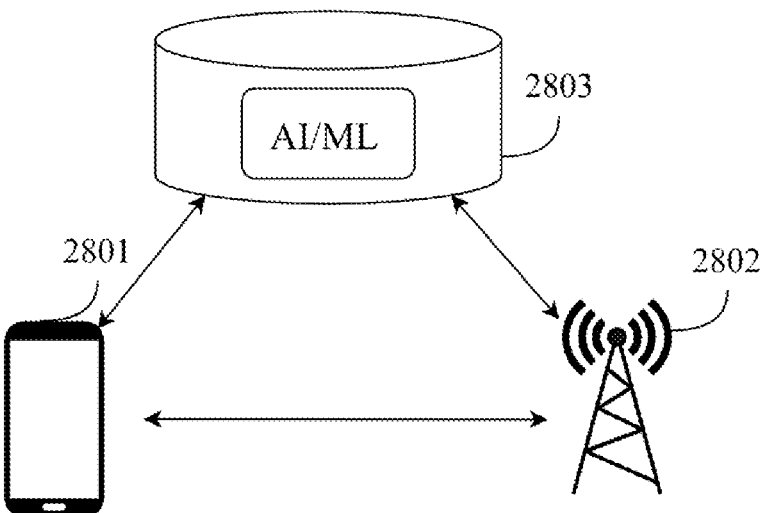
FIG. 28 exemplarily shows an illustration of a radio access network.

FIG. 28 exemplarily shows an illustration of a radio access network. A first device 2801 that is depicted as a UE including the device according various aspects as provided in this disclosure may communicate with a second device 2802 that is depicted as a BS including the device according to various aspects as provided in this disclosure. The first device 2801 and/or the second device 2802 are further communicatively coupled to a computing device (e.g. a cloud computing device) 2803 that implements the AI/ML as provided in this disclosure. Accordingly, the respective processors of the first device 2801 and/or the second device 2802 may provide the input to the computing device 2803 to obtain the output of the AI/ML.

The following examples pertain to further aspects of this disclosure.

In example 1A, the subject matter includes a device. The subject matter may include: a memory storing communication activity data may include information indicating a plurality of attributes with respect to communication activities over a radio connection between a user equipment (UE) and a base station (BS); and a processor configured to: provide the communication activity data to a trained machine learning model configured to predict a communication activity for the radio connection between the UE and the BS; encode a power preference information for transmission to the BS based on the predicted communication activity.

In example 2A, the subject matter of example 1A, can optionally include that the communication activity data includes network data indicating one or more attributes related to the radio connection between the UE and the BS occurred in a period of time. In example 3A, the subject matter of example 2A, can optionally include that the network data includes information indicating an access network type for the radio connection between the UE and the BS. In example 4A, the subject matter of any one of examples 2A to 3A, can optionally include that the network data includes information indicating at least one discontinuous reception (DRX) parameter received from the BS; can optionally include that the DRX parameter includes a parameter indicating at least one of DRX Cycle, a duration of ON time within one DRX Cycle, a DRX inactivity timer, a DRX retransmission timer, a short DRX Cycle, a DRX short cycle timer.

In example 5A, the subject matter of any one of examples 2A to 4A, can optionally include that the network data includes an identifier for the BS or a network operator operating through the BS. In example 6A, the subject matter of any one of examples 2A to 5A, can optionally include that the network data includes information indicating at least one power preference indicator (PPI) parameter received from the BS; can optionally include that the PPI parameter includes a parameter indicating at least one of a PPI timer, or a remaining duration with respect to a received PPI timer. In example 7A, the subject matter of any one of examples 2A to 6A, can optionally include that the network data includes at least one of a status information indicating whether the radio connection between the UE and the BS is active or inactive; a state information indicating the radio state of the UE.

In example 8A, the subject matter of any one of examples 2A to 7A, can optionally include that the network data includes at least one of a plurality of reference signal received powers (RSRPs) generated in response to received reference signals; a message information indicating one or more attributes of the received/transmitted messages; a time-of-departure for messages, time-of-arrival for messages, a flag indicating whether the respective message is transmitted or received, an identifier for a user, a message type. In example 9A, the subject matter of any one of examples 1A to 8A, can optionally include that the communication activity data includes device data indicating one or more attributes of the UE. In example 10A, the subject matter of claim 9A, can optionally include that the UE includes a battery; can optionally include that the subject matter data includes a battery information indicating at least one of a current battery level of the UE or one or more predefined constraints with respect to a battery of the UE.

In example 11A, the subject matter of any one of claims 9A or 10A, can optionally include that the subject matter data includes a location information indicating a location related to the UE. In example 12A, the subject matter of any one of claims 9A to 11A, can optionally include that the subject matter data includes at least one of an amount of data available for transmission to the BS in an uplink buffer, a type information indicating a device type of the UE, can optionally include that the type information includes information indicating at least a machine-type communication (MTC) type device, an internet of things (IoT) type device, a low cost MTC, a category information indicating a category of the UE, or a smartphone, a capability information indicating supported attributes of the UE, can optionally include that the capability information includes information indicating at least one of a DRX support of the UE, a wake-up radio (WuR) information related to the UE, a time information indicating the current time.

In example 13A, the subject matter of any one of claims 9A to 12A, can optionally include that the subject matter data includes a user information indicating a behavior related to the user currently using the UE; can optionally include that the user information includes a behavior pattern or a predicted behavior. In example 14A, the subject matter of any one of claims 1A to 13A, can optionally include that the communication activity data includes application data indicating one or more attributes of running applications on the UE; can optionally include that the application data includes a network characteristics information indicating an expected measure of network performances; can optionally include that the network characteristics information includes information for at least one of the running applications indicating at least one of a quality of service (QoS) requirements, a quality of experience (QoE) requirements, a quality score, a latency tolerance, a category of latency, or a perceptual measure.

In example 15A, the subject matter of any one of claims 1A to 14A, can optionally include that the communication activity data includes a time series data may include a data element for each attribute for a plurality of instances of time. In example 16A, the subject matter of example 15A, can optionally include that the time series data includes the data elements for a plurality of instances of time; can optionally include that each instance is a predefined period of time; can optionally include that the time series data includes the data elements for a predefined plurality of instance of time. In example 17A, the subject matter of any one of claims 1A to 16A, can optionally include that the machine learning model is configured to provide an output indicating at least one of a binary value representing the information to be encoded as the power performance information. In example 18A, the subject matter of example 17A, can optionally include that the machine learning model is configured to provide the output indicating a confidence score associated with the binary value.

In example 19A, the subject matter of any one of examples 17A or 18A, can optionally include that one of the binary values represents a decision that the power preference information is to be encoded with an indication of a low power mode. In example 20A, the subject matter of any one of examples 17A to 19A, can optionally include that the machine learning model is configured to provide an output may include an evaluation score indicating a probability of the predicted network activity allowing the UE to operate in the low power mode. In example 21A, the subject matter of any one of examples 17A to 20A, can optionally include that the machine learning model is further configured to determine the output based on the predicted network activity. In example 22A, the subject matter of any one of examples 17A to 21A, can optionally include that the processor is further configured to encode the power preference information based on the output of the machine learning model.

In example 23A, the subject matter of any one of claims 1A to 22A, can optionally include that the predicted network activity indicates a duration of time in which one or more components of a transceiver of the UE is to be deactivated or to operate in a low power mode. In example 24A, the subject matter of any one of claims 1A to 23A, can optionally include that the processor is further configured to operate in a first operation mode in which the trained machine learning model provides an output, and a second operation mode in which the trained machine learning model does not provide an output; can optionally include that the processor is further configured to adaptively switch from the first operation mode to the second operation mode based on an event indicated by any one of the attributes provided in the communication activity data. In example 25A, the subject matter of example 24A, can optionally include that the processor is further configured to operate in the second operation mode in response to a detection of a charging event at the UE.

In example 26A, the subject matter of any one of claims 1A to 25A, can optionally include that the trained machine learning model includes a recursive neural network (RNN); can optionally include that the trained machine learning model includes a RNN long short-term memory (LSTM). In example 27A, the subject matter of example 26A, can optionally include that the LSTM is configured to receive a plurality of attributes provided by the communication activity data as input features, each input feature includes a plurality of input feature elements in a time-series data; can optionally include that the LSTM is configured to provide an output indicating the predicted network activity based on the input features. In example 28A, the subject matter of example 27A, can optionally include that the LSTM is configured to provide the output based on the input features of a time window may include a plurality of consecutive instances of time.

In example 29A, the subject matter of example 28A, can optionally include that the LSTM is configured to provide the output based on a plurality of machine learning model parameters, can optionally include that the processor is further configured to optimize the plurality of machine learning model parameters based on a quality metric determined in response to the output of the LSTM; can optionally include that the quality metric includes at least one of an accuracy of prediction, a number of data packets lost due to UE being in a low power mode, or a delay performance of one of the applications.

In example 30A, the subject matter of claim 1A to 29A, can optionally include that the trained machine learning model includes a reinforcement learning model with a plurality of machine learning model parameters; can optionally include that the processor is further configured to determine an action based on a state indicated by the attributes provided in the communication activity data at a first instance of time; can optionally include that the processor is further configured to determine a reward in response to the determined action based on a state indicated by the attributes provided in the communication activity data at a second instance time; can optionally include that the processor is further configured to determine a further action in response to the determined reward. In example 31A, the subject matter of example 30A, can optionally include that the reinforcement learning model is trained based on a utility function maximizing a QoS or a QoE metric.

In example 32A, the subject matter of example 31A, can optionally include that the processor is further configured to determine the reward further based on at least one of an impact on QoS or QoE based latencies, a change in the buffer length, missed data packets, or a number of retransmissions. In example 33A, the subject matter of any one of claims 1A to 32A, can optionally include that the processor is further configured to select one of encoding the power preference information indicating a low-power mode or encoding the power preference information indicating a QoS mode. In example 34A, the subject matter of any one of claims 1A to 33A, can optionally include that the memory is configured to store machine learning model parameters; can optionally include that the processor is configured to implement the trained machine learning model based on the machine learning model parameters. In example 35A, a system may include: a user equipment (UE) may include the subject matter of any one of claims 1A to 34; an external processor that is external to the UE; can optionally include that the external processor is communicatively coupled to the UE; can optionally include that the external processor is configured to implement the trained machine learning model.

In example 36A, a method may include: storing communication activity data may include information indicating a plurality of attributes with respect to communication activities over a radio connection between a user equipment (UE) and a base station (BS); providing the communication activity data to a trained machine learning model configured to predict a network activity for the radio connection between the UE and the BS; encoding a power preference information for transmission to the BS based on the predicted network activity.

In example 37A, a non-transitory computer-readable medium may include one or more instructions which, if executed by a processor, to cause the processor to: control a memory to store communication activity data may include information indicating a plurality of attributes with respect to communication activities over a radio connection between a user equipment (UE) and a base station (BS); provide the communication activity data to a trained machine learning model configured to predict a network activity for the radio connection between the UE and the BS; encode a power preference information for transmission to the BS based on the predicted network activity.

In example 38A, the subject matter may include a device including a memory storing communication activity data may include information indicating a plurality of attributes with respect to communication activities over radio connections between one or more user equipments (UEs) and a base station (BS); a processor configured to: provide the communication activity data to a trained machine learning model configured to predict a communication activity for one of the radio connections between a respective UE of the one or more UEs and the BS; configure one or more network parameters for the radio connection between the respective UE of the one or more UEs and the BS based on the predicted communication activity.

In example 39A, the subject matter of example 38A, can optionally include that the processor is further configured to encode a message to indicate the configured network parameters for transmission to the respective UE. In example 40A, the subject matter of example 39A, can optionally include that the communication activity data includes network data indicating one or more attributes related to the radio connections between the one or more UE and the BS occurred in a period of time. In example 41A, the subject matter of example 40A, can optionally include that the network data includes information indicating an access network type for each radio connection between the one or more UEs and the BS.

In example 42A, the subject matter of example 40A or example 41A, can optionally include that the network data includes information indicating at least one discontinuous reception (DRX) parameter assigned for each one of the one or more UEs; can optionally include that the DRX parameter includes a parameter indicating at least one of DRX Cycle, a duration of ON time within one DRX Cycle, a DRX inactivity timer, a DRX retransmission timer, a short DRX Cycle, a DRX short cycle timer. In example 43A, the subject matter of any one of examples 40A to 42A, can optionally include that the network data includes information indicating at least one power preference indicator (PPI) received from at least some of the one or more UEs; can optionally include that the PPI parameter includes a parameter indicating at least one of a PPI timer, or a remaining duration with respect to a received PPI timer. In example 44A, the subject matter of any one of examples 40A to 43A, can optionally include that the network data includes at least one of a status information indicating whether the radio connection between each one of the one or more UEs and the BS is active or inactive or a state information indicating a radio state of each one of the one or more UEs.

In example 45A, the subject matter of any one of examples 40A to 44A, can optionally include that the network data includes at least one of a plurality of reference signal received powers (RSRPs) generated in response to received reference signals; a message information indicating one or more attributes of the received/transmitted messages; a time-of-departure for messages, time-of-arrival for messages, a flag indicating whether the respective message is transmitted or received, an identifier for a user, a message type. In example 46A, the subject matter of any one of examples 40A to 45A, can optionally include that the network data includes a scheduling information indicating communication scheduling of each one of the one or more UEs; can optionally include that the scheduling information includes information indicating at least one of scheduled resources, a duration of a schedulable transmission slots, or granularity for each one of the one or more UEs. In example 47A, the subject matter of any one of examples 40A to 46A, can optionally include that the network data includes an overall network situation information indicating a quality metric with respect to the radio connections between the one or more UEs and the BS.

In example 48A, the subject matter of any one of examples 40A to 47A, can optionally include that the communication activity data includes device data indicating one or more attributes of the one or more UEs. In example 49A, the subject matter of example 48A, can optionally include that the processor is further configured to decode received messages received from the one or more UEs; can optionally include that each one of the decoded messages comprise information about one or more attributes of a respective UE of the one or more UEs that transmitted the respective decoded message. In example 50A, the subject matter of example 49A, can optionally include that the subject matter data includes a received battery information indicating at least one of a current battery level of the one or more UEs or one or more predefined constraints with respect to a battery of the one or more UEs. In example 51A, the subject matter of example 49A or example 50A, can optionally include that the subject matter data includes a received location information of the one or more UEs.

In example 52A, the subject matter of any one of examples 49A to 51A, can optionally include that the subject matter data further includes at least for the respective UE at least one of an amount of data available for transmission to the BS in an uplink buffer, a type information indicating a device type, can optionally include that the type information includes information indicating at least a machine-type communication (MTC) type device, an internet of things (IoT) type device, a low cost MTC, or a smartphone, a capability information indicating supported attributes, can optionally include that the capability information includes information indicating at least one of a DRX support, a wake-up radio (WuR) information, a time information indicating the current time; a power information indicating a power of each one of the one or more UEs, a QoS preference information. In example 53A, the subject matter of any one of examples 49A to 52A, can optionally include that the subject matter data includes a user information indicating a behavior pattern or a predicted behavior.

In example 54A, the subject matter of any one of examples 49A to 53A, can optionally include that the processor is further configured to decode received messages may include application data from the one or more UEs; can optionally include that the communication activity data includes the application data indicating one or more attributes of running applications on each one of the one or more UEs; can optionally include that the application data includes a network characteristics information indicating an expected measure of network performances; can optionally include that the network characteristics information includes information for at least one of the running applications indicating at least one of a quality of service (QoS) requirements, a quality of experience (QoE) requirements, a quality score, a latency tolerance, a category of latency, or a perceptual measure. In example 55A, the subject matter of any one of examples 40A to 54A, can optionally include that the communication activity data includes a time series data may include a data element for each attribute of each one of the one or more UEs for a plurality of instances of time; can optionally include that the time series data includes the data elements for a plurality of instances of time; can optionally include that each instance is a predefined period of time; can optionally include that the time series data includes the data elements for a predefined plurality of instance of time.

In example 56A, the subject matter of any one of examples 40A to 55A, can optionally include that the machine learning is configured to provide an output recommending one or more network parameters to be used for the radio connection between the respective UE of the one or more UEs and the BS. In example 57A, the subject matter of any one of examples 40A to 56A, can optionally include that the machine learning model is configured to provide an output indicating an estimation of a power preference of the respective UE of the one or more UEs. In example 58A, the subject matter of any one of examples 40A to 57A, can optionally include that the machine learning model is configured to provide an output indicating a selected DRX parameter for the respective UE of the one or more UEs. In example 59A, the subject matter of any one of examples 40A to 58A, can optionally include that the machine learning model is configured to provide an output indicating a determined bandwidth part (BWP) for the respective UE of the one or more UEs. In example 60A, the subject matter of any one of examples 40A to 59A, can optionally include that the machine learning model is configured to provide an output indicating one or more wake up signal (WUS) parameters for the respective UE of the one or more UEs. In example 61A, the subject matter of any one of examples 40A to 60A, can optionally include that the machine learning model is configured to provide an output indicating an operation in an idle mode for the respective UE of the one or more UEs.

In example 62A, the subject matter of any one of examples 40A to 61A, can optionally include that the processor is further configured to configure the network parameters for the radio connection between the respective UE of the one or more UEs and the BS based on the output of the machine learning model. In example 63A, the subject matter of any one of examples 40A to 62A, can optionally include that the processor is further configured to encode a message may include information indicating one or more of the configured network parameters to the respective UE of the one or more UEs. In example 64A, the subject matter of any one of examples 40A to 63A, can optionally include that the machine learning model includes: a first machine learning model configured to provide an output indicating a selection of a method from a DRX method, a BWP method, a WUS method, or an idle mode operation for the respective UE of the one or more UEs based on the communication activity data; a second machine learning model configured provide an output indicating parameters for the selected method based on the communication activity data and the output of the first machine learning model.

In example 65A, the subject matter of any one of examples 40A to 64A, can optionally include that the processor is further configured to form a group of UEs may include a plurality of UEs of the one or more UEs; can optionally include that the machine learning model is configured to predict the communication activity for the radio connections between each UE of the group of UEs and the BS. In example 66A, the subject matter of any one of examples 40A to 65A, can optionally include that the processor is further configured to operate in a first operation mode in which the trained machine learning model provides an output, and a second operation mode in which the trained machine learning model does not provide an output; can optionally include that the processor is further configured to adaptively switch from the first operation mode to the second operation mode based on an event indicated by any one of the features provided in the communication activity data.

In example 67A, the subject matter of any one of examples 38A to 66A, can optionally include that the trained machine learning model includes a recursive neural network (RNN); can optionally include that the trained machine learning model includes an RNN long short-term memory (LSTM). In example 68A, the subject matter of example 67A, can optionally include that the LSTM is configured to receive a plurality of attributes provided by the communication activity data as input features, each input feature includes a plurality of input feature elements in a time-series data; can optionally include that the LSTM is configured to provide an output indicating the predicted communication activity based on the input features. In example 69A, the subject matter of example 68A, can optionally include that the LSTM is configured to provide the output based on the input features of a time window may include a plurality of consecutive instances of time.

In example 70A, the subject matter of example 69A, can optionally include that the LSTM is configured to provide the output based on a plurality of machine learning model parameters, can optionally include that the processor is further configured to optimize the plurality of machine learning model parameters based on a quality metric determined in response to the output of the LSTM; can optionally include that the quality metric includes at least one of an accuracy of prediction, a number of data packets lost due to UE being in a low power mode, or a delay performance of one of the applications. In example 71A, the subject matter of any one of examples 38A to 70A, can optionally include that the trained machine learning model includes a reinforcement learning model with a plurality of machine learning model parameters; can optionally include that the processor is further configured to determine an action based on a state indicated by the attributes provided in the communication activity data at a first instance of time; can optionally include that the processor is further configured to determine a reward in response to the determined action based on a state indicated by the attributes provided in the communication activity data at a second instance time; can optionally include that the processor is further configured to determine a further action in response to the determined reward.

In example 72A, the subject matter of example 71A, can optionally include that the reinforcement learning model is trained based on a utility function maximizing a QoS or a QoE metric. In example 73A, the subject matter of example 72A, can optionally include that the processor is further configured to determine the reward further based on at least one of an impact on QoS or QoE based latencies, a change in the buffer length, missed data packets, or a number of transmissions. In example 74A, the subject matter of any one of examples 40A to 73A, can optionally include that the memory is configured to store machine learning model parameters; can optionally include that the processor is configured to implement the trained machine learning model based on the machine learning model parameters. In example 75A, a system may include: a base station (BS) may include the subject matter of any one of examples 40A to 75; an external processor that is external to the BS; can optionally include that the external processor is communicatively coupled to the BS; can optionally include that the external processor is configured to implement the trained machine learning model.

In example 76A, a method may include: storing communication activity data may include information indicating a plurality of attributes with respect to communication activities over radio connections between one or more user equipments (UEs) and a base station (BS); providing the communication activity data to a trained machine learning model configured to predict a communication activity for one of the radio connections between a respective UE of the one or more UEs and the BS; configuring one or more network parameters for the radio connection between the respective UE of the one or more UEs and the BS based on the predicted communication activity.

In example 77A, a non-transitory computer-readable medium may include one or more instructions which, if executed by a processor, cause the processor to: control a memory configured to store communication activity data may include information indicating a plurality of attributes with respect to communication activities over radio connections between one or more user equipments (UEs) and a base station (BS); provide the communication activity data to a trained machine learning model configured to predict a communication activity for one of the radio connections between a respective UE of the one or more UEs and the BS; configure one or more network parameters for the radio connection between the respective UE of the one or more UEs and the BS based on the predicted communication activity.

In example 1B, the subject matter includes a device including a memory storing one or more measurement results indicating measurements of downlink communication signals received from a base station (BS); a processor configured to: provide the one or more measurement results to a trained machine learning module configured to determine a transmission power parameter based on the one or more measurement results; set a transmit power to transmit uplink communication signals from a user equipment (UE) to the BS based on the determined transmission power parameter.

In example 2B, the subject matter of example 1B, further including: a measurement circuit to measure the received downlink communication signals to obtain the one or more measurement results. In example 3B, the subject matter of example 2B, wherein the one or more measurement results includes a plurality of in-phase and quadrature samples based on the received downlink communication signals. In example 4B, the subject matter of example 3B, wherein the measurement circuit is configured to generate the plurality of in-phase and quadrature samples based on the received downlink communication signals. In example 5B, the subject matter of any one of examples 1B to 4B, wherein the one or more measurement results includes a plurality of Fast Fourier Transform (FFT) samples based on the received downlink communication signals. In example 6B, the subject matter of example 5B, wherein the measurement circuit is configured to generate the plurality of FFT samples based on the received downlink communication signals.

In example 7B, the subject matter of any one of examples 1B to 6B, wherein the one or more measurement results includes one or more signal measurements including at least one of a reference signal received power (RSRP), a received signal strength indicator (RSSI), or reference signal received quality (RSRQ), or other forms of processed signals. In example 8B, the subject matter of example 7B, wherein the measurement circuit is configured to measure a power of the received downlink communication signal over a defined bandwidth. In example 9B, the subject matter of any one of examples 1B to 8B, further including: wherein the memory is further configured to store a context information; wherein the context information includes information indicating at least one of a nominal power parameter with respect to the BS, a path loss compensation parameter, mobility of the UE, or a location of the UE. 10. the subject matter of example 9B, can optionally include that the context information further includes information indicating at least one of a time, a velocity of the UE, an identifier for a network operator operating through the BS, an identifier of the BS, a network mode, a measured downlink or uplink rate for a period of time, a modulation level, a past power level, a number of resource blocks allocated for the UE, a number of retransmissions to transmit communication signals to the BS, or a channel quality indicator.

In example 11B, the subject matter of example 9B or example 10B, can optionally include that the processor is further configured to decode a received message to obtain at least a portion of the context information from the BS. In example 12B, the subject matter of any one of examples 9B to 12B, can optionally include that the processor is further configured to provide the context information to the machine learning model; can optionally include that the machine learning model is configured to determine the transmission power parameter based on the context information and the one or more measurement results. In example 13B, the subject matter of any one of examples 9B to 12B, can optionally include that the nominal power parameter includes an open loop nominal power indicating an expected transmit power for physical random access channel (PRACH). In example 14B, the subject matter of any one of examples 9B to 13B, can optionally include that the processor is further configured to perform an open loop power control based on the determined transmission power parameter. In example 15B, the subject matter of any one of examples 9B to 14B, can optionally include that the nominal power parameter includes at least one of a nominal power for physical uplink shared channel (PUSCH) or a nominal power for physical uplink control channel (PUCCH). In example 16B, the subject matter of any one of examples 9B to 15B, can optionally include that the processor is further configured to perform a closed loop power control based on the determined transmission power parameter.

In example 17B, the subject matter of any one of examples 9B to 16B, can optionally include that the trained machine learning model includes a recursive neural network. In example 18B, the subject matter of example 17B, can optionally include that the trained machine learning model includes a long short-term memory (LSTM). In example 19B, the subject matter of any one of examples 17B or 18B, can optionally include that the LSTM is configured to receive a plurality of attributes may include the one or more measurement results and the context information, each input feature includes a plurality of input feature elements in a time-series data; can optionally include that the LSTM is configured to provide an output indicating transmission power parameter based on the input features. In example 20B, the subject matter of example 19B, can optionally include that the LSTM is configured to provide the output based on the input features of a time window may include a plurality of consecutive instances of time. can optionally include that the LSTM is configured to provide the output based on a plurality of machine learning model parameters, can optionally include that the processor is further configured to optimize the plurality of machine learning model parameters based on a quality metric determined in response to the output of the LSTM; can optionally include that the quality metric includes a number of retransmissions to transmit the uplink communication signals.

In example 21B, the subject matter of any one of examples 9B to 16B, can optionally include that the trained machine learning model includes a reinforcement learning model with a plurality of machine learning model parameters; can optionally include that the processor is further configured to determine a first transmit power parameter based on a state indicated by the one or more measurement results, the context information, and a transmission power at a first instance of time; can optionally include that the processor is further configured to determine a reward in response to the first transmit power parameter based on a state indicated by at least one of a throughput of the uplink communication signal transmission or a total energy at a second instance time after the UE transmitted uplink communication signals based on the first transmit power parameter; can optionally include that the processor is further configured to determine a second transmit power parameter in response to the determined reward.

In example 22B, the subject matter of any one of examples 1B to 21B, can optionally include that the processor is further configured to set the transmit power based on the determined transmission power parameter and a maximum allowed transmit power parameter. In example 23B, the subject matter of example 22B, can optionally include that the maximum allowed transmit power parameter includes a maximum power level; can optionally include that the processor is further configured to set the transmit power as the predicted power level in case the predicted power level is lower than the maximum power level, or otherwise set the transmit power as the maximum power level. In example 24B, the subject matter of any one of examples 1B to 23B, can optionally include that the processor is further configured to store information indicating one or more of the one or more measurements, the set transmit power levels, the determined transmit power parameters, throughput levels with respect to the set transmit power levels, a number of transmissions with respect to the set transmit power levels, radio link failures with respect to the set transmit power levels. In example 25B, the subject matter of example 24B, can optionally include that the processor is further configured to encode the stored information. In example 26B, the subject matter of any one of examples 1B to 25B, can optionally include that the processor is further configured to receive and decode training data may include information indicating one or more of one or more measurements, set transmit power levels, determined transmit power parameters, throughput levels with respect to the set transmit power levels, a number of transmissions with respect to the set transmit power levels, radio link failures with respect to the set transmit power levels; can optionally include that the processor is further configured to train the machine learning model based on the training data.

In example 27B, the subject matter of example any one of examples 1B to 26B, can optionally include that the processor is further configured to encode information indicating a power headroom based on the determined transmission power parameter. In example 28B, the subject matter of example 27B, can optionally include that the determined transmission power parameter includes a predicted power level. In example 29B, the subject matter of example 27B or example 28B, can optionally include that the processor is further configured to encode a medium access layer control element (MAC CE) indicating the power headroom. In example 30B, the subject matter of any one of examples 27B to 29B, can optionally include that the processor is further configured to encode the information based on a difference between a current transmit power and the predicted power level.

In example 31B, the subject matter of any one of examples 27B to 30B, can optionally include that the machine learning is configured to determine the power headroom. In example 32B, the subject matter of any one of examples 27B to 31B, can optionally include that the processor is further configured to calculate the power headroom based on a maximum allowed transmit power, a current or a most recent transmit power for transmissions to the BS, the predicted power level, and a number of resource blocks allocated for the UE. In example 33B, the subject matter of any one of examples 1B to 32B, can optionally include that the memory is configured to store machine learning model parameters; can optionally include that the processor is configured to implement the trained machine learning model based on the machine learning model parameters.

In example 34B, a system may include: a user equipment (UE) may include the device of any one of examples 1B to 33; an external processor that is external to the UE; can optionally include that the external processor communicatively coupled to the UE; can optionally include that the external processor is configured to implement the machine learning model.

In example 35B, a non-transitory computer-readable medium may include one or more instructions which, if executed by a processor, cause the processor to: control a memory to store one or more measurement results indicating measurements of received downlink communication signals; provide the one or more measurement results to a trained machine learning module configured to determine a transmission power parameter based on the one or more measurement results; set a transmit power to transmit uplink communication signals based on the determined transmission power parameter.

In example 36B, a method may include: storing a one or more measurement results indicating measurements of received communication signals; providing the one or more measurement results to a trained machine learning module configured to determine a transmission power parameter based on the one or more measurement results; setting a transmit power to transmit uplink communication signals based on the determined transmission power parameter.

In example 37B, the subject matter includes a device that may include: a memory storing one or more measurement results indicating measurements of uplink communication signals received from a user equipment (UE) by a base station (BS); a processor configured to: provide the one or more measurement results to a trained machine learning module configured to determine a transmission power parameter for the UE based on the one or more measurement results; encode information indicating a transmit power level for the UE based on the determined transmission power parameter.

In example 38B, the subject matter of example 37B, further may include a measurement circuit to measure received uplink communication signals to obtain the one or more measurement results. In example 39B, the subject matter of example 37B or example 38B, can optionally include that the processor is further configured to encode information indicating a power headroom based on the determined transmission power parameter. In example 40B, the subject matter of any one of examples 37B to 39B, can optionally include that the one or more measurement results includes a plurality of in-phase and quadrature samples based on the received uplink communication signals. In example 41B, the subject matter of example 40B, can optionally include that the measurement circuit is configured to generate the plurality of in-phase and quadrature samples based on the received downlink communication signals. In example 42B, the subject matter of any one of examples 37B to 41B, can optionally include that the one or more measurement results includes a plurality of Fast Fourier Transform (FFT) samples based on the received uplink communication signals.

In example 43B, the subject matter of example 42B, can optionally include that the measurement circuit is configured to generate the plurality of FFT samples based on the received uplink communication signals. In example 44B, the subject matter of example any one of examples 37B to 43B, can optionally include that the one or more measurement results includes one or more signal measurements may include at least one of a reference signal received power (RSRP), a received signal strength indicator (RSSI), or reference signal received quality (RSRQ). In example 45B, the subject matter of example 44B, can optionally include that the measurement circuit is configured to measure a power of the received uplink communication signal over a defined bandwidth.

In example 46B, the subject matter of any one of examples 37B to 45B, can optionally include that the memory is further configured to store a context information; can optionally include that the context information includes information indicating at least one of a nominal power parameter with respect to the BS, a path loss compensation parameter, a mobility of the UE, or a location of the UE. In example 47B, the subject matter of example 46B, can optionally include that the context information further includes information indicating at least one of a time parameter, a velocity of the UE, an identifier for an operator, an identifier of the UE, a network mode of the UE, a measured downlink or uplink rate by the UE for a period of time, a modulation level, a past transmit power level of the UE, a number of resource blocks allocated for the UE, a number of retransmissions by the UE to transmit uplink communication signals to the BS, or a channel quality indicator (CQI). In example 48B, the subject matter of example 47B, can optionally include that the processor is further configured to decode a received message from the UE to obtain at least a portion of the context information.

In example 49B, the subject matter of any one of examples 46B to 49B, can optionally include that the processor is further configured to provide the context information to the machine learning model; can optionally include that the machine learning model is configured to determine the transmission power parameter for the UE based on the context information and the one or more measurement results. In example 50B, the subject matter of any one of examples 47B to 49B, can optionally include that the nominal power parameter includes at least one of a nominal power for physical uplink shared channel (PUSCH) or a nominal power for physical uplink control channel (PUCCH). In example 51B, the subject matter of any one of examples 47B to 50B, can optionally include that the processor is further configured to perform a closed loop power control based on the determined transmission power parameter. In example 52B, the subject matter of any one of examples 46B to 51B, can optionally include that the trained machine learning model includes a recursive neural network. In example 53B, the subject matter of example 52B, can optionally include that the trained machine learning model includes a long short-term memory (LSTM). In example 54B, the subject matter of example 53B, can optionally include that the LSTM is configured to receive a plurality of attributes may include the one or more measurement results and the context information as input features, each input feature includes a plurality of input feature elements in a time-series data; can optionally include that the LSTM is configured to provide an output indicating transmission power parameter based on the input features. In example 55B, the subject matter of example 54B, can optionally include that the LSTM is configured to provide the output based on the input features of a time window may include a plurality of consecutive instances of time. In example 56B, the subject matter of example 55B, can optionally include that the LSTM is configured to provide the output based on a plurality of machine learning model parameters, can optionally include that the processor is further configured to optimize the plurality of machine learning model parameters based on a quality metric determined in response to the output of the LSTM; can optionally include that the quality metric includes a received number of retransmissions to transmit the uplink communication signals.

In example 57B, the subject matter of any one of examples 46B to 51B, can optionally include that the trained machine learning model includes a reinforcement learning model with a plurality of machine learning model parameters; can optionally include that the processor is further configured to determine a first transmit power parameter based on a state indicated by the one or more measurement results, the context information, and a received transmission power information at a first instance of time; can optionally include that the processor is further configured to determine a reward in response to the first transmit power parameter based on a state indicated by at least one of a throughput of the uplink communication signals or a received total energy information at a second instance time after the UE transmitted uplink communication signals based on the first transmit power parameter; can optionally include that the processor is further configured to determine a second transmit power parameter in response to the determined reward.

In example 58B, the subject matter of any one of examples 37B to 57B, can optionally include that the processor is further configured to set the transmit power based on the determined transmission power parameter and a maximum allowed transmit power parameter. In example 59B, the subject matter of example 58B, can optionally include that the maximum allowed transmit power parameter includes a maximum power level; can optionally include that the processor is further configured to set the transmit power as the predicted power level in case the predicted power level is lower than the maximum power level, or otherwise set the transmit power as the maximum power level. In example 60B, the subject matter of any one of examples 37B to 59B, can optionally include that the processor is further configured to store information indicating one or more of the one or more measurements, the set transmit power levels, the determined transmit power parameters, throughput levels with respect to the set transmit power levels, a number of transmissions with respect to the set transmit power levels, radio link failures with respect to the set transmit power levels.

In example 61B, the subject matter of example 60B, can optionally include that the processor is further configured to encode the stored information. In example 62B, the subject matter of any one of examples 37B to 61B, can optionally include that the processor is further configured to receive and decode training data may include information indicating one or more of one or more measurements, set transmit power levels, determined transmit power parameters, throughput levels with respect to the set transmit power levels, a number of transmissions with respect to the set transmit power levels, radio link failures with respect to the set transmit power levels; can optionally include that the processor is further configured to train the machine learning model based on the training data. In example 63B, the subject matter of any one of examples 37B to 62B, can optionally include that the machine learning is configured to determine the power headroom for the UE. In example 64B, the subject matter of example 63B, can optionally include that the determined transmission power parameter includes a predicted power level for the UE.

In example 65B, the subject matter of example 64B, can optionally include that the processor is further configured to calculate the power headroom for the UE based on a maximum allowed transmit power for the UE, a current or a most recent transmit power level of the UE, the predicted power level for the UE, and a number of resource blocks assigned for the UE. In example 66B, the subject matter of example 65B, can optionally include that the processor is further configured to determine the transmit power level for the UE based on the determined power headroom for the UE. In example 67B, the subject matter of any one of examples 37B to 66B, can optionally include that the encoded information includes a transmission power control command. In example 68B, the subject matter of example 67B, can optionally include that the transmission power control command is encoded via at least one of a medium access layer control element (MAC CE) or a transmission power control field in a downlink control information (DCI). In example 69B, the subject matter of example 68B, can optionally include that the transmission control command is configured to indicate a change at the transmit power level of the UE. In example 70B, the subject matter of any one of examples 37B to 69B, can optionally include that the memory is configured to store machine learning model parameters; can optionally include that the processor is configured to implement the trained machine learning model based on the machine learning model parameters.

In example 71B, a system may include: a base station (BS) may include the device of any one of examples 37B to 70; an external processor that is external to the BS; can optionally include that the external processor communicatively coupled to the BS; can optionally include that the external processor is configured to implement the machine learning model.

In example 72B, a non-transitory computer-readable medium may include one or more instructions which, if executed by a processor, cause the processor to: control a measurement of received uplink communication signals to obtain one or more measurement results; provide the one or more measurement results to a trained machine learning module configured to determine a transmission power parameter based on the one or more measurement results; encode information indicating a transmit power level based on the determined transmission power parameter.

In example 73B, a method may include: controlling a measurement of received uplink communication signals to obtain one or more measurement results; providing the one or more measurement results to a trained machine learning module configured to determine a transmission power parameter based on the one or more measurement results; encoding information indicating a transmit power level based on the determined transmission power parameter.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:
a memory configured to store communication activity data comprising information indicating a plurality of attributes with respect to communication activities over a radio connection between a user equipment (UE) and a base station (BS), wherein the plurality of attributes comprise network data indicating one or more network related attributes, device data indicating one or more device related attributes, and application data indicating one or more application related attributes including Quality of Service (QoS) requirements for one or more running applications; and
a processor configured to:
provide the communication activity data to a trained machine learning model configured to predict a future period of communication inactivity for the radio connection between the UE and the BS based on the plurality of attributes including the QoS requirements; and
in response to the future period of inactivity meeting a criterion related to a duration of the future period of inactivity and an impact on the QoS requirements of the one or more running applications, encode a power preference information for transmission to the BS.

2. The device of claim 1,
wherein the communication activity data comprises network data indicating one or more attributes related to the radio connection between the UE and the BS occurred in a period of time.

3. The device of claim 2,
wherein the network data comprises information indicating at least one of an access network type for the radio connection between the UE and the BS, discontinuous reception (DRX) parameter received from the BS, wherein the DRX parameter comprises a parameter indicating at least one of DRX Cycle, a duration of ON time within one DRX Cycle, a DRX inactivity timer, a DRX retransmission timer, a short DRX Cycle, a DRX short cycle timer, an identifier for the BS or a network operator operating through the BS, at least one power preference indicator (PPI) parameter received from the BS, wherein the PPI parameter comprises a parameter indicating at least one of a PPI timer, or a remaining duration with respect to a received PPI timer,
at least one of a status information indicating whether the radio connection between the UE and the BS is active or inactive, or a state information indicating the radio state of the UE.

4. The device of claim 3,
wherein the network data comprises at least one of a plurality of reference signal received powers (RSRPs) generated in response to received reference signals; a message information indicating one or more attributes of the received/transmitted messages; a time-of-departure for messages, time-of-arrival for messages, a flag indicating whether the respective message is transmitted or received, an identifier for a user, or a message type.

5. The device of claim 4,
wherein the communication activity data comprises device data indicating one or more attributes of the UE, wherein the device data comprises at least one of a battery information indicating at least one of a current battery level of the UE or one or more predefined constraints with respect to a battery of the UE, a location information indicating a location related to the UE, an amount of data available for transmission to the BS in an uplink buffer, a type information indicating a device type of the UE, wherein the type information comprises information indicating at least a machine-type communication (MTC) type device, an internet of things (IoT) type device, a low cost MTC, a category information indicating a category of the UE, or a smartphone, a capability information indicating supported attributes of the UE, wherein the capability information comprises information indicating at least one of a DRX support of the UE, a wake-up radio (WuR) information related to the UE, a time information indicating the current time, or a user information indicating a behavior related to the user currently using the UE, wherein the user information comprises a behavior pattern or a predicted behavior.

6. The device of claim 5,
wherein the communication activity data comprises application data indicating one or more attributes of running applications on the UE;
wherein the application data comprises a network characteristics information indicating an expected measure of network performances;
wherein the network characteristics information comprises information for at least one of the running applications indicating at least one of a quality of service (QoS) requirements, a quality of experience (QoE) requirements, a quality score, a latency tolerance, a category of latency, or a perceptual measure.

7. The device of claim 1,
wherein the trained machine learning model is configured to provide an output indicating at least one of a binary value representing the information to be encoded as the power performance information, a confidence score associated with the binary value, wherein one of the binary values represents a decision that the power preference information is to be encoded with an indication of a low power mode, or an evaluation score indicating a probability of the predicted network activity allowing the UE to operate in the low power mode.

8. The device of claim 7,
wherein the predicted network activity indicates a duration of time in which one or more components of a transceiver of the UE is to be deactivated or to operate in a low power mode.

9. The device of claim 1,
wherein the processor is further configured to operate in a first operation mode in which the trained machine learning model provides an output, and a second operation mode in which the trained machine learning model does not provide an output;
wherein the processor is further configured to adaptively switch from the first operation mode to the second operation mode based on an event indicated by any one of the attributes provided in the communication activity data.

10. The device of claim 1,
wherein the trained machine learning model comprises a recursive neural network (RNN);
wherein the trained machine learning model comprises a RNN long short-term memory (LSTM)
wherein the LSTM is configured to receive a plurality of attributes provided by the communication activity data as input features, each input feature comprises a plurality of input feature elements in a time-series data;
wherein the LSTM is configured to provide an output indicating the predicted network activity based on the input features;
wherein the LSTM is configured to provide the output based on a plurality of machine learning model parameters,
wherein the processor is further configured to optimize the plurality of machine learning model parameters based on a quality metric determined in response to the output of the LSTM;
wherein the quality metric comprises at least one of an accuracy of prediction, a number of data packets lost due to UE being in a low power mode, or a delay performance of one of the applications.

11. The device of claim 1,
wherein the trained machine learning model comprises a reinforcement learning model with a plurality of machine learning model parameters;
wherein the processor is further configured to determine an action based on a state indicated by the attributes provided in the communication activity data at a first instance of time;
wherein the processor is further configured to determine a reward in response to the determined action based on a state indicated by the attributes provided in the communication activity data at a second instance time;
wherein the processor is further configured to determine a further action in response to the determined reward;
wherein the reinforcement learning model is trained based on a utility function maximizing a QoS or a QoE metric;
wherein the processor is further configured to determine the reward further based on at least one of an impact on QoS or QoE based latencies, a change in the buffer length, missed data packets, or a number of retransmissions.

12. A device comprising:
a memory configured to store communication activity data comprising information indicating a plurality of attributes with respect to communication activities over radio connections between one or more user equipments (UEs) and a base station (BS), wherein the communication activity data pertaining to each UE comprise network data indicating one or more network related attributes, device data indicating one or more device related attributes, and application data indicating one or more application related attributes including Quality of Service (QoS) requirements for one or more running applications;
a processor configured to:
provide the communication activity data pertaining to the respective UE of the one or more UEs to a trained machine learning model configured to predict a future period of communication inactivity for one of the radio connections between the respective UE of the one or more UEs and the BS based on the plurality of attributes including the QoS requirements pertaining to the UE; and
in response to the future period of communication inactivity meeting a criterion related to duration of the future period of communication inactivity and an impact on the QoS requirements of the one or more running applications, configure one or more network parameters for the radio connection between the respective UE of the one or more UEs and the BS.

13. The device of claim 12,
wherein the communication activity data comprises network data indicating one or more attributes related to the radio connections between the one or more UE and the BS occurred in a period of time.

14. The device of claim 13,
wherein the trained machine learning model is configured to provide an output indicating at least one of an estimation of a power preference of the respective UE of the one or more UEs, a selected DRX parameter for the respective UE of the one or more UEs, a determined bandwidth part (BWP) for the respective UE of the one or more UEs, one or more wake up signal (WUS) parameters for the respective UE of the one or more UEs, an operation in an idle mode for the respective UE of the one or more UEs.

15. A device comprising:
a memory configured to store one or more measurement results indicating measurements of downlink communication signals received from a base station (BS);
a processor configured to:
provide the one or more measurement results to a first trained machine learning module configured to determine a first transmission power parameter for an open-loop power control configuration based on the one or more measurement results;
provide the one or more measurement results to a second trained machine learning module configured to determine a second transmission power parameter for a closed-loop power control configuration based on the one or more measurement results;
selectively use one of the first or second trained machine learning module based on a current power control configuration of the device to obtain a determined transmission power parameter being the first transmission power parameter or the second transmission power parameter; and set a transmit power to transmit uplink communication signals from a user equipment (UE) to the BS based on the determined transmission power parameter.

16. The device of claim 15, wherein the memory is further configured to store a context information;

wherein the context information comprises information indicating at least one of a nominal power parameter with respect to the BS, a path loss compensation parameter, mobility of the UE, or a location of the UE, a time, a velocity of the UE, an identifier for a network operator operating through the BS, an identifier of the BS, a network mode, a measured downlink or uplink rate for a period of time, a modulation level, a past power level, a number of resource blocks allocated for the UE, a number of retransmissions to transmit communication signals to the BS, or a channel quality indicator.

17. The device of claim 16, wherein the processor is further configured to provide the context information to at least one of the first trained machine learning module or the second trained machine learning module;

wherein at least one of the first trained machine learning module or the second machine learning module is configured to determine the transmission power parameter based on the context information and the one or more measurement results.

18. The device of claim 17, wherein the processor is further configured to perform an open loop power control based on the determined transmission power parameter or a closed loop power control based on the determined transmission power parameter.

19. The device of claim 16, wherein the processor is further configured to store information indicating one or more of the one or more measurements, the set transmit power levels, the determined transmit power parameters, throughput levels with respect to the set transmit power levels, a number of transmissions with respect to the set transmit power levels, radio link failures with respect to the set transmit power levels;

wherein the processor is further configured to receive and decode training data comprising information indicating one or more of one or more measurements, set transmit power levels, determined transmit power parameters, throughput levels with respect to the set transmit power levels, a number of transmissions with respect to the set transmit power levels, radio link failures with respect to the set transmit power levels;

wherein the processor is further configured to train at least one of the first machine learning module or the second machine learning module based on the training data.

20. The device of claim 16, wherein at least one of the first trained machine learning module or the second trained machine learning module is configured to predict a power headroom, wherein the processor is further configured to encode information indicating the predicted power headroom.

21. A device comprising:

a memory configured to store one or more measurement results indicating measurements of uplink communication signals received from a user equipment (UE) by a base station (BS);

a processor configured to:

provide the one or more measurement results to a first trained machine learning module configured to determine a first transmission power parameter for an open-loop power control configuration for the UE based on the one or more measurement results;

provide the one or more measurement results to a second trained machine learning module configured to determine a second transmission power parameter for a closed-loop power control configuration for the UE based on the one or more measurement results;

selectively use one of the first or second trained machine learning modules based on a current power control configuration of the device to obtain a determined transmission power parameter being the first transmission power parameter or the second transmission power parameter; and encode information indicating a transmit power level for the UE based on the determined transmission power parameter.

22. The device of claim 21, wherein the memory is further configured to store a context information;

wherein the context information comprises information indicating at least one of a nominal power parameter with respect to the BS, a path loss compensation parameter, a mobility of the UE, or a location of the UE, a time parameter, a velocity of the UE, an identifier for an operator, an identifier of the UE, a network mode of the UE, a measured downlink or uplink rate by the UE for a period of time, a modulation level, a past transmit power level of the UE, a number of resource blocks allocated for the UE, a number of retransmissions by the UE to transmit uplink communication signals to the BS, or a channel quality indicator (CQI).

23. The device of claim 22, wherein the processor is further configured to provide the context information to at least one of the first machine learning module or the second machine learning module;

wherein the at least one of the first machine learning model or the second machine learning module is configured to determine the transmission power parameter for the UE based on the context information and the one or more measurement results.

24. The device of claim 23, wherein the nominal power parameter comprises at least one of a nominal power for physical uplink shared channel (PUSCH) or a nominal power for physical uplink control channel (PUCCH), wherein the processor is further configured to perform a closed loop power control based on the determined transmission power parameter.

25. The device of claim 24, wherein the processor is further configured to determine the transmit power level for the UE based on a determined power headroom for the UE;

wherein the processor is further configured to encode information comprising a transmission power control command based on the determined power headroom for the UE.

* * * * *